US011438806B2

(12) United States Patent
Hori et al.

(10) Patent No.: US 11,438,806 B2
(45) Date of Patent: Sep. 6, 2022

(54) TERMINAL APPARATUS, BASE STATION APPARATUS, AND METHOD

(71) Applicants: Sharp Kabushiki Kaisha, Osaka (JP); FG Innovation Company Limited, Tuen Mun (HK)

(72) Inventors: Takako Hori, Sakai (JP); Shohei Yamada, Sakai (JP); Hidekazu Tsuboi, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 31 days.

(21) Appl. No.: 16/763,572

(22) PCT Filed: Nov. 9, 2018

(86) PCT No.: PCT/JP2018/041762
§ 371 (c)(1),
(2) Date: May 13, 2020

(87) PCT Pub. No.: WO2019/098148
PCT Pub. Date: May 23, 2019

(65) Prior Publication Data
US 2020/0367108 A1 Nov. 19, 2020

(30) Foreign Application Priority Data
Nov. 15, 2017 (JP) .............................. JP2017-219902

(51) Int. Cl.
*H04W 28/24* (2009.01)
*H04W 76/27* (2018.01)
(Continued)

(52) U.S. Cl.
CPC ........... *H04W 28/24* (2013.01); *H04W 76/27* (2018.02); *H04W 80/08* (2013.01); *H04W 92/10* (2013.01)

(58) Field of Classification Search
CPC ........... H04W 280/02; H04W 28/0263; H04W 76/30; H04W 80/08; H04W 28/24; H04W 92/10; H04W 76/27
See application file for complete search history.

(56) References Cited

U.S. PATENT DOCUMENTS

2015/0098446 A1 4/2015 Ye
2020/0037197 A1* 1/2020 Cho ..................... H04W 76/30

FOREIGN PATENT DOCUMENTS

EP    3 603 167 A1    2/2020
WO   2018/174521 A1   9/2018

OTHER PUBLICATIONS

Asustek, "Presence of UL SDAP header on default DRB", 3GPP TSG-RAN WG2 Meeting #101-Bis, R2-1804286, Apr. 16-20, 2018, 8 pages.
(Continued)

*Primary Examiner* — Anez C Ebrahim
(74) *Attorney, Agent, or Firm* — Keating & Bennett, LLP

(57) ABSTRACT

To provide a technique related to a terminal apparatus, a method, and an integrated circuit for efficiently performing communication between a base station apparatus and the terminal apparatus by correctly managing QoS. A terminal apparatus for communicating with one or multiple base station apparatuses, the terminal apparatus including: a receiver configured to receive an RRC reconfiguration message from a base station apparatus of the one or multiple base station apparatuses; and a processing unit configured to establish an SDAP entity, and notify higher layers of a list of QoS flow identifiers corresponding to an established DRB having a DRB identity and DRB establishment information,
(Continued)

in a case that DRB configuration including the DRB identity that is not part of configuration of the terminal apparatus, in a DRB configuration list included in the RRC reconfiguration message received by the receiver, includes SDAP entity configuration, and that a PDU session identifier associated with the SDAP configuration is not in part of configuration of the terminal apparatus.

4 Claims, 13 Drawing Sheets

(51) Int. Cl.
   *H04W 80/08* (2009.01)
   *H04W 92/10* (2009.01)

(56) References Cited

OTHER PUBLICATIONS

Huawei et al. "QoS message flows", 3GPP TSG-RAN WG2 Meeting #98, R2-1704977, May 15-19, 2017, 3 pages.
Huawei, "SDAP (Re)Configuration", 3GPP TSG-RAN WG2 Meeting #99Bis, R2-1710227, Oct. 9-13, 2017, 3 pages.
Official Communication issued in International Patent Application No. PCT/JP2018/041762 dated Jan. 29, 2019.
Ericsson, "TP for RRCConnectionReconfiguration", 3GPP TSG-RAN WG2 #99bis, Tdoc R2-1711967, Oct. 9-13, 2017, 8 pages.
Ericsson, "[NR-AH2#12][NR]", 3GPP TSG-RAN WG2 #99, Tdoc R2-1708036, Aug. 21-25, 2017, 6 pages.
Huawei et al., "Endorsed 3GPP TS 37.324 specification v1.1.0", 3GPP TSG-RAN WG2 #99bis, R2-1711866, Oct. 9-13, 2017, 16 pages.
"3rd Generation Partnership Project; Technical Specification Group Radio Access Network; E-UTRA and NR; Service Data Adaptation Protocol (SDAP) specification (Release 15)", 3GPP TS 37.324 V1.0.0, Sep. 2017, pp. 1-15.
"3rd Generation Partnership Project; Technical Specification Group Services and System Aspects; Procedures for the 5G System; Stage 2 (Release 15)", 3GPP TS 23.502 V1.3 0, Nov. 2017, pp. 1-215.
"LTE; General Packet Radio Service (GPRS) enhancements for Evolved Universal Terrestrial Radio Access Network KE-UTRAN) access (3GPP TS 23.401 version 14.3.0 Release 14)", ETSI TS 123 401 V14.3.0, May 2017, 393 pages.
"3rd Generation Partnership Project; Technical Specification Group Radio Access Network; NR; Medium Access Control (MAC) protocol specification (Release 15)", 3GPP TS 38.321 V0.0.3, May 2017, pp. 1-20.
"3rd Generation Partnership Project; Technical Specification Group Radio Access Network; NR; Radio Link Control (RLC) protocol specification (Release 15)", 3GPP TS 38.322 V0.0 2, May 2017, pp. 1-18.
"3rd Generation Partnership Project; Technical Specification Group Radio Access Network; NR; Packet Data Convergence Protocol (PDCP) specification (Release 15)", 3GPP TS 38.323 V0.0.5, May 2017, pp. 1-24.
"3rd Generation Partnership Project; Technical Specification Group Radio Access Network; NR; Radio Resource Control (RRC); Protocol specification (Release 15 )", 3GPP TS 38.331 V0.0.3, May 2017, pp. 1-20.
"3rd Generation Partnership Project; Technical Specification Group Radio Access Network; NR; NR and NG-RAN Overall Description; Stage 2 (Release 15)", 3GPP TS 38.300 V0.4.1, Jun. 2017, pp. 1-54.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.1.1, Jun. 2017, pp. 1-31.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.1, Mar. 2017, pp. 1-106.
"3rd Generation Partnership Project; Technical Specification Group Radio Access Network; Evolved Universal Terrestrial Radio Access (E-UTRA); Radio Link Control (RLC) protocol specification (Release 14)", 3GPP Ts 36.322 714.0.0, Mar. 2017, pp. 1-45.
"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.2.0, Mar. 2017, pp. 1-43.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.2, Apr. 2017, pp. 1-721.
"3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 14)", 3GPP TS 36.300 V14.2.0, Mar. 2017, pp. 1-330.
"3rd Generation Partnership Project; Technical Specification Group Services and System Aspects; System Architecture for the 5G System; Stage 2 (Release 15)", 3GPP TS 23.501 V1.0.0, Jun. 2017, pp. 1-145.
NTT DOCOMO, Inc., "New WID on New Radio Access Technology", 3GPP TSG RAN Meeting #75, RP-170855, Mar. 6-9, 2017, 14 pages.
Intel Corporation, "SDAP Configuration in RRC message", 3GPP TSG-RAN WG2 Meeting #99bis, R2-1710615, Oct. 9-13, 2017, 5 pages.
Vivo, "Discussion on the configuration of SDAP", 3GPP TSG-RAN WG2 Meeting #99, R2-1708500, Aug. 21-25, 2017, 8 pages.
Vivo, "Discussion on the configuration of SDAP", 3GPP TSG-RAN WG2 Meeting #99bis, R2-1710933, Oct. 9-13, 2017, 6 pages.

* cited by examiner

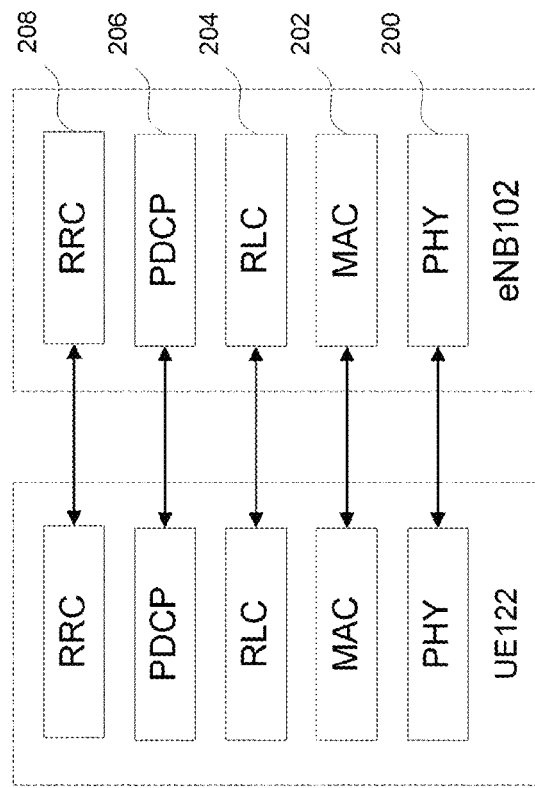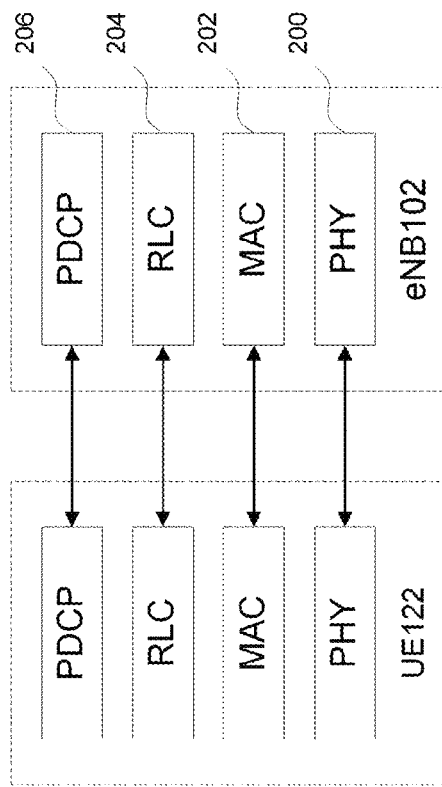
FIG. 2

```
<OMITTED>
DRB-ToAddModList ::= SEQUENCE (size (1..maxDRB)) OF DRB-ToAddMod
    <PARTLY OMITTED>
DRB-ToAddMod ::= SEQUENCE {
    <PARTLY OMITTED>
    pduSession-Identity        PDUSession-Identity,
    drb-Identity               DRB-Identity,
    sdap-Config                SDAP-Config,
    <PARTLY OMITTED>
}
    <PARTLY OMITTED>
PDUSession-Identity ::= INTEGER (1..16)
    <PARTLY OMITTED>
DRB-Identity ::= INTEGER (1..32)
    <PARTLY OMITTED>
SDAP-Config ::= SEQUENCE {
    <PARTLY OMITTED>
    qosFlowIdAddList           QoSFlowIDAddList          OPTIONAL,
    qosFlowIdReleaseList       QoSFlowIDReleaseList      OPTIONAL,
    sdapHeader-UL              ENUMERATED {true}         OPTIONAL,
    sdapHeader-DL              ENUMERATED {true}         OPTIONAL,
    reflective                 ENUMERATED {true}         OPTIONAL,
    default                    ENUMERATED {true}         OPTIONAL,
    <PARTLY OMITTED>
}
    <PARTLY OMITTED>
DRB-ToReleaseList ::= SEQUENCE (size (1..maxDRB)) OF DRB-Identity
    <PARTLY OMITTED>
QoSFlowIDAddList ::= SEQUENCE (size (1..maxQoSFlowID)) OF QoSFlow-identity
    <PARTLY OMITTED>
QoSFlowIDReleaseList ::= SEQUENCE (size (1..maxQoSFlowID)) OF QoSFlow-identity
    <OMITTED>
```

FIG. 6

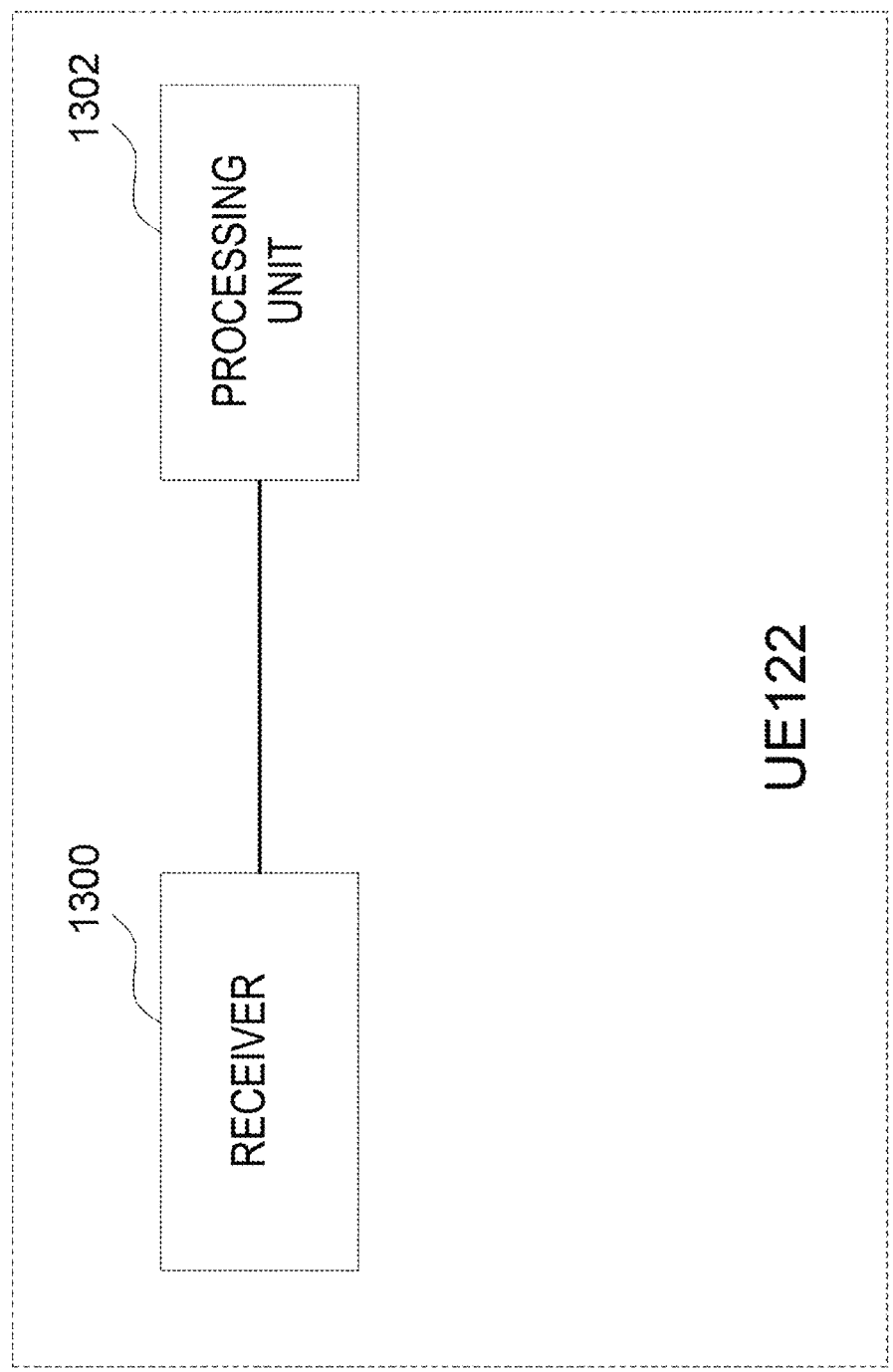

TERMINAL APPARATUS, BASE STATION APPARATUS, AND METHOD

TECHNICAL FIELD

The present invention relates to a terminal apparatus, a base station apparatus, and a method.

BACKGROUND ART

A radio access scheme and a radio network for cellular mobile communications (which will hereinafter be referred to as "Long Term Evolution (LTE; trade name)" or "Evolved Universal Terrestrial Radio Access (EUTRA)") and a core network (which will be referred to as "Evolved Packet Core or EPC") have been studied by the 3rd Generation Partnership Project (3GPP).

As a radio access scheme and a radio network technology for a 5th-generation cellular system, technical studies and standardization of LTE-Advanced Pro, which is an enhanced technology of LTE, and New Radio technology (NR), which is a new radio access technology, have been conducted by the 3GPP (NPL 1). 5 Generation Core Network (5GC), which is a core network for a 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501, "System Architecture for the 5G System; Stage 2"
NPL 3: 3GPP TS 36.300, "Evolved Universal Terrestrial Radio Access (E-UTRA) and Evolved Universal Terrestrial Radio Access Network (E-UTRAN); Overall description; Stage 2"
NPL 4: 3GPP TS 36.331, "Evolved Universal Terrestrial Radio Access (E-UTRA); Radio Resource Control (RRC); Protocol specifications"
NPL 5: 3GPP TS 36.323, "Evolved Universal Terrestrial Radio Access (E-UTRA); Packet Data Convergence Protocol (PDCP) specification"
NPL 6: 3GPP TS 36.322, "Evolved Universal Terrestrial Radio Access (E-UTRA); Radio Link Control (RLC) protocol specification"
NPL 7: 3GPP TS 36.321, "Evolved Universal Terrestrial Radio Access (E-UTRA); Medium Access Control (MAC) protocol specification"
NPL 8: 3GPP TS 37.340, "Evolved Universal Terrestrial Radio Access (E-UTRA) and NR; Multi-Connectivity; Stage 2"
NPL 9: 3GPP TS 38.300, "NR; NR and NG-RAN Overall description; Stage 2"
NPL 10: 3GPP TS 38.331, "NR; Radio Resource Control (RRC); Protocol specifications"
NPL 11: 3GPP TS 38.323, "NR; Packet Data Convergence Protocol (PDCP) specification"
NPL 12: 3GPP TS 38.322, "NR; Radio Link Control (RLC) protocol specification"
NPL 13: 3GPP TS 38.321, "NR; Medium Access Control (MAC) protocol specification"
NPL 14: 3GPP TS 23.401 v14.3.0, "General Packet Radio Service (GPRS) enhancements for Evolved Universal Terrestrial Radio Access Network (E-UTRAN) access"
NPL 15: 3GPP TS 23.502, "Procedure for 5G System; Stage 2"
NPL 16: 3GPP TS 37.324, "NR; Service Data Adaptation Protocol (SDAP) specification"

SUMMARY OF INVENTION

Technical Problem

As one of NR technical studies, protocols for a radio access layer are studied which perform Quality of Service (QoS) management between higher layers than the Internet Protocol (IP) layer and a radio access layer of NR.

However, there is a problem in that the management of QoS cannot be performed correctly, and communication between a base station apparatus and a terminal apparatus cannot be efficiently performed in a case that necessary information is not transmitted and/or received between the higher layers and the radio access layer.

In view of the circumstances described above, an object of an aspect of the present invention is to provide a terminal apparatus capable of efficiently communicating with a base station apparatus, a base station apparatus for communicating with the terminal apparatus, a method used for the terminal apparatus, a method used for the base station apparatus, and an integrated circuit mounted on the terminal apparatus.

Solution to Problem

In order to accomplish the object described above, an aspect of the present invention is contrived to provide the following means. Specifically, an aspect of the present invention is a terminal apparatus for communicating with a base station apparatus, the terminal apparatus including: a receiver configured to receive, from the base station apparatus, a Radio Resource Control (RRC) reconfiguration message including a Data Radio Bearer (DRB) identity to be released; a storage unit configured to store a Quality of Service (QoS) flow to DRB mapping rule, the DRB identity being associated with a Service Data Adaptation Protocol (SDAP) entity; and a processing unit configured to release all of a plurality of the QoS flow to DRB mapping rules corresponding to a DRB indicated by the DRB identity, based on the RRC reconfiguration message.

An aspect of the present invention is a base station apparatus for communicating with a terminal apparatus, the base station apparatus including: a generation unit configured to generate a Radio Resource Control (RRC) reconfiguration message including a Data Radio Bearer (DRB) identity to be released; and a transmitter configured to transmit the RRC reconfiguration message to the terminal apparatus, wherein the DRB identity is associated with a Service Data Adaptation Protocol (SDAP) entity, the terminal apparatus includes a storage unit configured to store a Quality of Service (QoS) flow to DRB mapping rule, and the RRC reconfiguration message is a message for causing the terminal apparatus to release all of a plurality of the QoS flow to DRB mapping rules corresponding to a DRB indicated by the DRB identity.

An aspect of the present invention is a method performed by a terminal apparatus for communicating with a base station apparatus, the method including the steps of: storing a Quality of Service (QoS) flow to Data Radio Bearer (DRB) mapping rule in a storage unit; receiving, from the base station apparatus, a Radio Resource Control (RRC) reconfiguration message including a DRB identity to be released;

and releasing all of a plurality of the QoS flow to DRB mapping rules corresponding to a DRB indicated by the DRB identity, based on the RRC reconfiguration message, wherein the DRB identity is associated with a Service Data Adaptation Protocol (SDAP) entity.

An aspect of the present invention is a method performed by a terminal apparatus for communicating with a base station apparatus, the method including the steps of: generating a Radio Resource Control (RRC) reconfiguration message including a Data Radio Bearer (DRB) identifier to be released; and transmitting the RRC reconfiguration message to the terminal apparatus, wherein the terminal apparatus includes a storage unit configured to store a Quality of Service (QoS) flow to DRB mapping rule, and the RRC reconfiguration message is a message for causing the terminal apparatus to release all of a plurality of the QoS flow to DRB mapping rules corresponding to a DRB indicated by the DRB identity.

Advantageous Effects of Invention

According to an aspect of the present invention, a terminal apparatus can correctly perform QoS management and can communicate efficiently.

BRIEF DESCRIPTION OF DRAWINGS

FIG. 2 is a diagram of protocol stacks of the UP and the CP of a terminal apparatus and a base station apparatus in E-UTRA according to embodiments of the present invention.

FIG. 6 is a diagram illustrating an example of information related to DRB configuration involved in SDAP configuration, and Abstract Syntax Notation One (ASN.1) description of information, according to each embodiment of the present invention.

FIG. 13 is a block diagram illustrating a configuration of a terminal apparatus according to Embodiment 3 of the present invention.

DESCRIPTION OF EMBODIMENTS

Embodiments of the present invention will be described below in detail with reference to the drawings.

LTE (and LTE-A Pro) and NR may be defined as different RATs. NR may be defined as a technology included in LTE. LTE may be defined as a technology included in NR. LTE capable of connecting with NR through Dual connectivity may be distinguished from conventional LTE. The present embodiment may be applied to NR, LTE and other RATs. Terms associated with LTE and NR are used in the following description. However, the present invention may be applied to other technologies using other terms.

Figure 1:
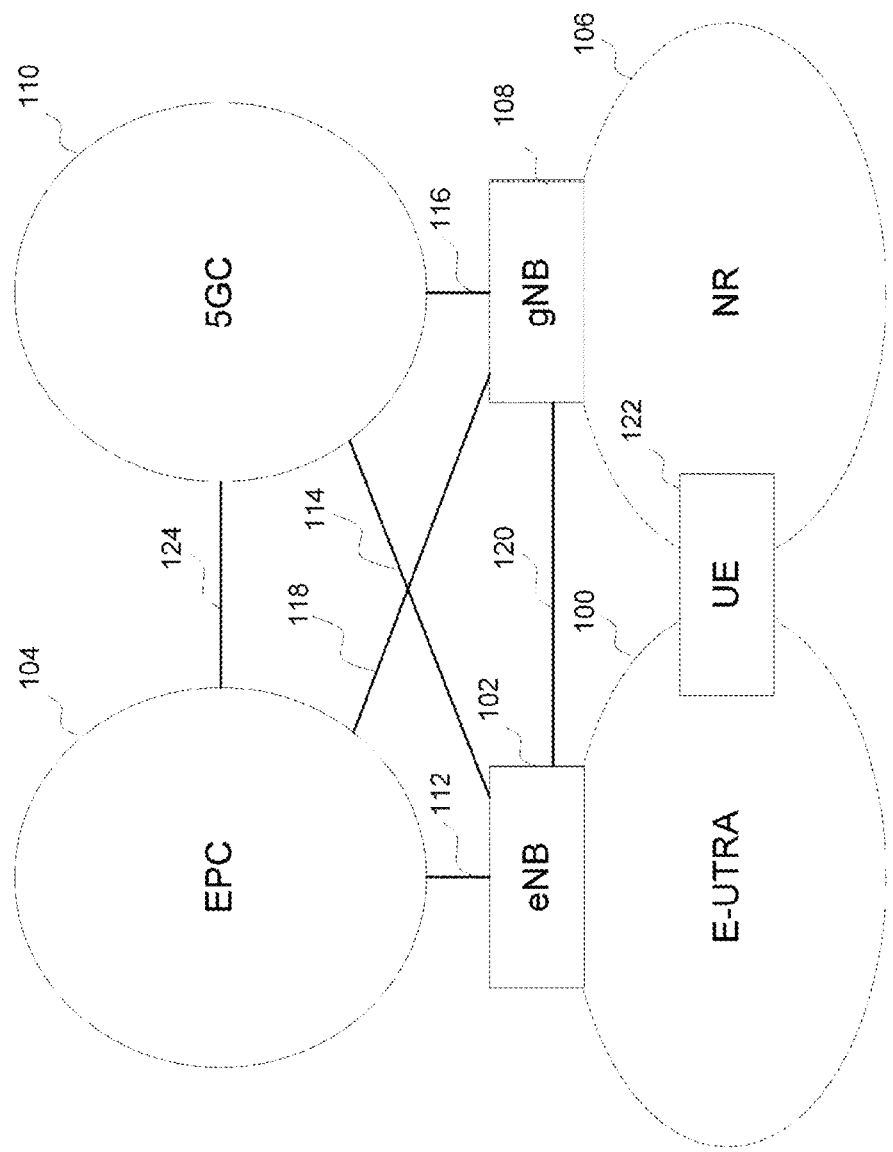
FIG. 1 is a schematic diagram of a communication system according to embodiments of the present invention.

FIG. 1 is a schematic diagram of a communication system according to embodiments of the present invention.

E-UTRA 100 is a radio access technology described in NPL 3 or the like, and is constituted by Cell Groups (CGs) configured in one or multiple frequency bands. An E-UTRAN Node B (eNB) 102 is a base station apparatus of E-UTRA. An Evolved Packet Core (EPC) 104 is a core network described in NPL 14 or the like and is designed as a core network for E-UTRA. An interface 112 is an interface between the eNB 102 and the EPC 104, where there is a Control Plane (CP) through which control signals transfer and a User Plane (UP) through which user data transfers.

NR 106 is a new radio access technology that is currently being studied by the 3GPP and includes Cell Groups (CGs) that are configured in one or multiple frequency bands. A gNode B (gNB) 108 is an NR base station apparatus. A 5GC 110 is a new core network for NR which is currently being studied by 3GPP, and is described in NPL 2 and the like.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, and the interface 124 are interfaces that transfer the CP only, or the UP only, or both the CP and the UP, and details are being discussed by 3GPP. The interface 114, the interface 116, the interface 118, the interface 120, and the interface 124 may not exist depending on communication systems provided by network operators.

A UE 122 is a terminal apparatus supporting NR or supporting both E-UTRA and NR.

FIG. 2 is a diagram of Protocol Stacks of the UP and the CP of the terminal apparatus and the base station apparatus in the E-UTRA radio access layer according to embodiments of the present invention.

FIG. 2(A) is a diagram of a protocol stack of the UP used in a case that the UE 122 communicates with the eNB 102.

A Physical layer (PHY) 200 is a radio physical layer for providing transmission services to higher layers by using Physical Channels. The PHY 200 is connected with a Medium Access Control layer (MAC) 202, which is a higher layer described below, via Transport Channels. Data is exchanged between the MAC 202 and the PHY 200 via the transport channels. The data is transmitted and/or received via radio physical channels between the PHYs of the UE 122 and the eNB 102.

The MAC 202 maps various Logical Channels to various transport channels. The MAC 202 is connected with a Radio Link Control layer (RLC) 204, which is a higher layer described below, via logical channels. The logical channels are roughly classified depending on types of information transmitted, specifically, classified into control channels transmitting control information and traffic channels transmitting user information. The MAC 202 has a function of controlling the PHY 200 in order to perform Discontinuous Reception and Transmission (DRX and DTX), a function of performing Random Access procedures, a function of reporting transmit power information, a function of performing HARQ control, and the like (NPL 7).

An RLC 204 divides (Segmentation) data received from a Packet Data Convergence Protocol Layer (PDCP) 206, which is a higher layer described below, and adjusts the data size such that lower layers can properly transmit data. The RLC 200 also has a function of ensuring Quality of Service (QoS) required for each piece of data. In other words, the RLC 204 has a function of data retransmission control or the like (NPL 6).

The PDCP 206 may have a header compression function for compressing unnecessary control information in order to efficiently transmit IP Packets, which are user data, in radio segments. The PDCP 206 may also have a data encryption function (NPL 5).

Note that data processed in the MAC 202, the RLC 204, and the PDCP 206 is referred to as MAC Protocol Data Units (PDUs), RLC PDUs, and PDCP PDUs, respectively. Data transferred from a higher layer to the MAC 202, the RLC 204, and the PDCP 206, or data to be transferred to a higher layer is referred to as MAC Service Data Units (SDUs), RLC SDUs, and PDCP SDUs, respectively.

FIG. 2(B) is a diagram of a protocol stack of the CP used in a case that the UE 122 communicates with the eNB 102.

In addition to the PHY 200, the MAC 202, the RLC 204, and the PDCP 206, there is a Radio Resource Control layer (RRC) 208 in the protocol stack of the CP. The RRC 208 performs configuration or reconfiguration of Radio Bearers (RBs) to control logical channels, transport channels, and physical channels. The RBs may be classified into Signaling Radio Bearers (SRBs) and Data Radio Bearers (DRBs), and the SRBs may be used as paths for transmitting RRC messages, which are control information. The DRBs may be used as paths for transmitting user data. Each RB may be configured in the RRCs 208 of the eNB 102 and the UE 122 (NPL 4).

The functional classification of the MAC 202, the RLC 204, the PDCP 206, and the RRC 208 described above is an example, and some or all of the respective functions may not be implemented. Some or all of the functions of each layer may be included in another layer.

Figure 3:
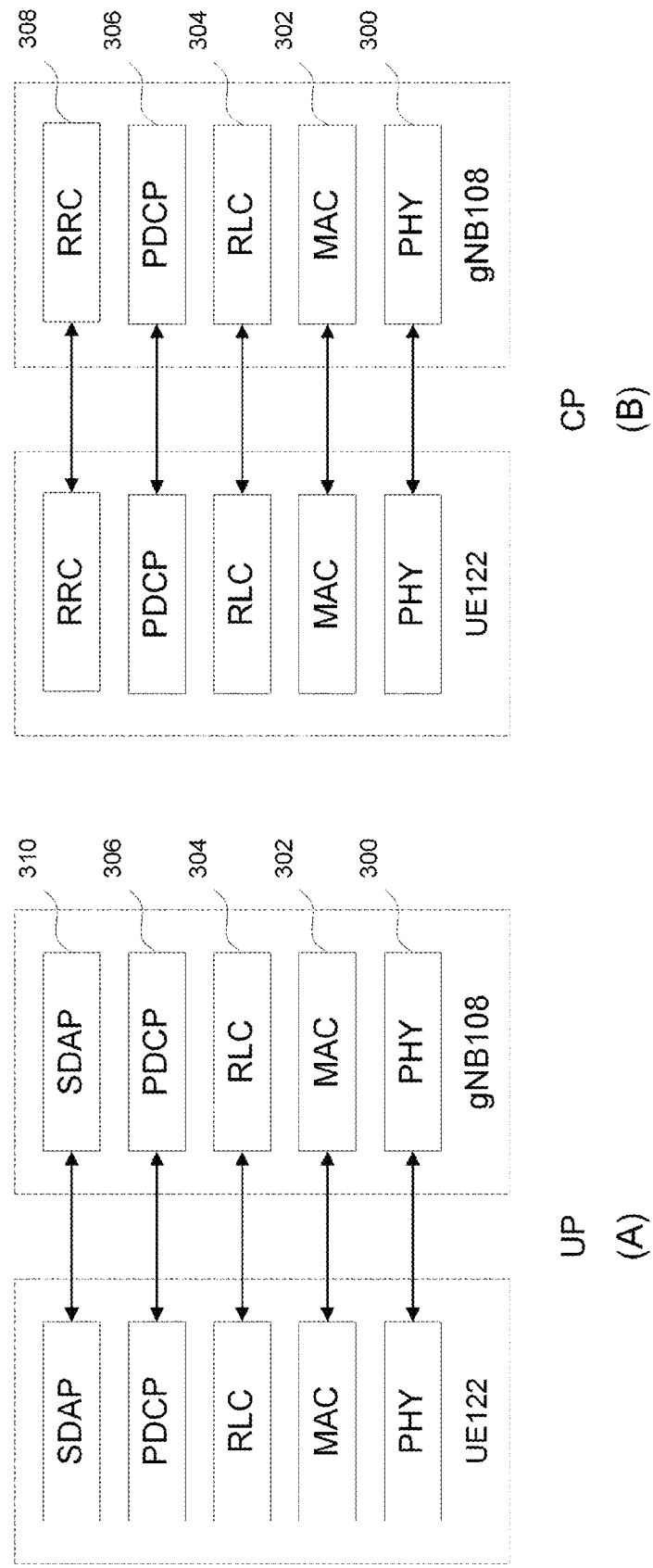
FIG. 3 is a diagram of protocol stacks of the UP and the CP of a terminal apparatus and a base station apparatus in NR according to embodiments of the present invention.

FIG. 3 is a diagram of Protocol Stacks of the UP and CP of the terminal apparatus and the base station apparatus in the NR radio access layer according to embodiments of the present invention.

FIG. 3(A) is a diagram of a protocol stack of the UP used in a case that the UE 122 communicates with the gNB 108.

A Physical layer (PHY) 300 is a radio physical layer of NR and may provide transmission services to higher layers by using Physical Channels. The PHY 300 may be connected with a Medium Access Control layer (MAC) 302, which is a higher layer described below, via Transport Channels. Data may be exchanged between the MAC 302 and the PHY 300 via the transport channels. The data may be transmitted and/or received between the PHYs of the UE 122 and the gNB 108 via radio physical channels. Unlike the radio physical layer PHY 200 of E-UTRA, details of the PHY 200 are under discussion by 3GPP.

The MAC 302 may map various Logical Channels to various transport channels. The MAC 302 may be connected with a Radio Link Control layer (RLC) 304, which is a higher layer described below, via logical channels. The logical channels are roughly classified depending on types of information transmitted, and may be classified into control channels transmitting control information and traffic channels transmitting user information. The MAC 302 may have a function of controlling the PHY 300 in order to perform Discontinuous Reception and Transmission (DRX and DTX), a function of performing Random Access procedures, a function of reporting transmit power information, a function of performing HARQ control, and the like (NPL 13). Unlike the MAC 202 of E-UTRA, details of the MAC 202 are under discussion by 3GPP.

The RLC 304 may divide (Segmentation) data received from a Packet Data Convergence Protocol Layer (PDCP) 206, which is a higher layer described below, and adjust the data size such that lower layers can properly transmit data. The RLC 304 may also have a function of ensuring Quality of Service (QoS) required for each piece of data. In other words, the RLC 304 may have a function of data retransmission control or the like (NPL 12). Unlike the RLC 204 of E-UTRA, details of the RLC 204 are under discussion by 3GPP.

A PDCP 306 may have a header compression function for compressing unnecessary control information in order to efficiently transmit IP Packets, which are user data, in radio segments. The PDCP 306 may also have a data encryption function (NPL 11). Unlike the PDCP 206 of E-UTRA, details of the PDCP 306 are under discussion by 3GPP.

A Service Data Adaptation Protocol (SDAP) 310 performs mapping of QoS flows and DRBs of downlink transmitted from a core network to a terminal apparatus via a base station apparatus, and mapping of QoS information flows and DRBs of uplink transmitted from a terminal apparatus to a core network via a base station apparatus, and may have a function for storing mapping rule information (NPL 16). QoS flows include one or more Service Data Flows (SDFs) that are processed by the same QoS policy (NPL 2). The SDAP 310 may have a function of Reflective QoS for performing mapping of QoS flows and DRBs of uplink, based on information of downlink QoS flows (NPL 2 and NPL 16). Details are under discussion by 3GPP.

Note that the IP layer, and the Transmission Control Protocol (TCP) layer, the User Datagram Protocol (UDP) layer, the application layer, and the like, which are higher than the IP layer, are higher layers of the SDAP (not illustrated). For the SDAP of a terminal apparatus, a layer for performing association between service data flows and QoS flows is also a higher layer of the SDAP.

Note that data processed in the MAC 302, the RLC 304, the PDCP 306, and the SDAP 310 may be referred to as MAC Protocol Data Units (PDUs), RLC PDUs, PDCP PDUs, and SDAP PDUs, respectively. Data transferred from a higher layer to the MAC 202, the RLC 204, and the PDCP 206, or data to be transferred to a higher layer may be referred to as MAC Service Data Units (SDUs), RLC SDUs, PDCP SDUs, and SDAP SDUs, respectively.

FIG. 3(B) is a diagram of a protocol stack of the CP used in a case that the UE 122 communicates with the gNB 108.

In addition to the PHY 300, the MAC 302, the RLC 304, and the PDCP 306, there is a Radio Resource Control layer (RRC) 308 in the protocol stack of the CP. The RRC 308 may perform configuration or reconfiguration of Radio Bearers (RBs) to control logical channels, transport channels, and physical channels. The RBs may be classified into Signaling Radio Bearers (SRBs) and Data Radio Bearers (DRBs), and the SRBs may be used as paths for transmitting RRC messages, which are control information. The DRBs may be used as paths for transmitting user data. Each RB may be configured in the RRCs 308 of the gNB 108 and the UE 122 (NPL 10).

The functional classification of the MAC 302, the RLC 304, the PDCP 306, the SDAP 310, and the RRC 308 described above is an example, and some or all of the respective functions may not be implemented. Some or all of the functions of each layer may be included in another layer.

Note that, in embodiments of the present invention, the MAC 202, the RLC 204, the PDCP 206, and the RRC 208 may be referred to as the MAC for E-UTRA or the MAC for LTE, the RLC for E-UTRA or the RLC for LTE, the PDCP for E-UTRA or the PDCP for LTE, and the RRC for E-UTRA or the RRC for LTE, respectively, to distinguish protocols of E-UTRA and NR hereinbelow. The MAC 302, the RLC 304, the PDCP 306, and the RRC 308 may also be referred to as the MAC for NR, the RLC for NR, the RLC for NR, and the RRC for NR, respectively.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. The PDCP 206 in FIG. 2 may also be replaced with the PDCP 306 in FIG. 3. The RRC 308 in FIG. 3 may include functions of the RRC 208 in FIG. 2. The PDCP 306 in FIG. 3 may be the PDCP 206 in FIG. 2.

Embodiment 1

Embodiment 1 of the present invention will be described with reference to FIG. 1 and FIG. 4 to FIG. 8.

Figure 4:
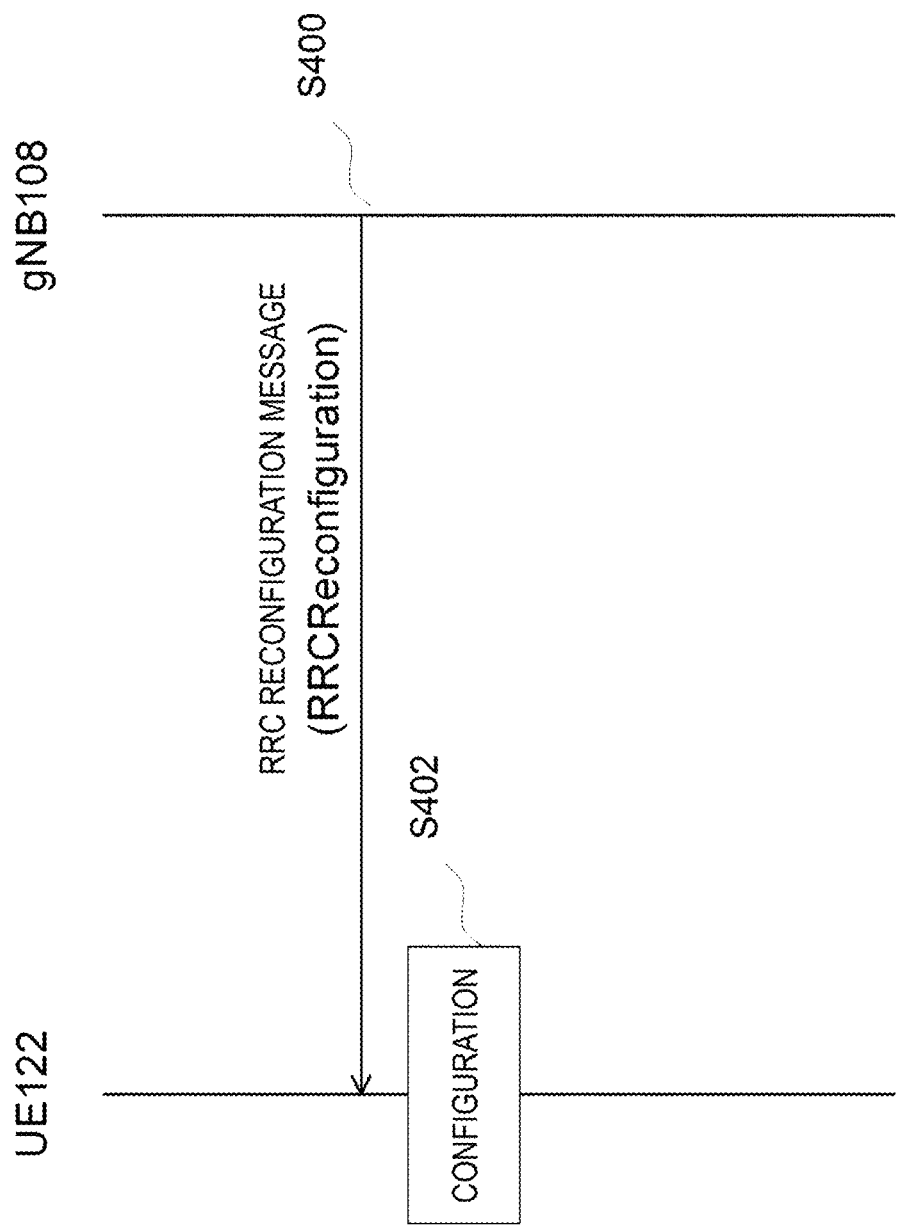
FIG. 4 is a diagram illustrating an example of a flow of an RRC reconfiguration procedure according to each embodiment of the present invention.

FIG. 4 is a diagram illustrating an example of a flow of an RRC reconfiguration procedure according to each embodiment of the present invention.

The RRC Reconfiguration procedure includes procedures used for handover and Mesurement and the like, in addition to establishment, change, and release of RBs, and change, release, and the like of secondary cells in NR as disclosed in NPL 10. According to each embodiment of the present invention, procedures used for establishment, change, and release of RBs, addition, change, and release of cell groups, handover and Mesurement, and the like in NR may be referred to as RRC reconfiguration procedures, or may have another designation. The procedures used for establishment, change, and release of RBs, addition, change, and release of cell groups, handover and Mesurement, and the like according to each embodiment of the present invention may be procedures in E-UTRA according to NPL 4, or may be referred to as RRC connection reconfiguration procedures.

In an RRC reconfiguration procedure, the UE 122 receives an RRC reconfiguration message (RRCReconfigration) from the gNB 108 (step S400), and performs various configurations according to information included in the RRC reconfiguration message, such as configuration of DRBs (step S402). After step S402, the UE 122 may transmit an RRC reconfiguration complete message (RRCReconfigrationComplete) and the like to the gNB 108 (not illustrated).

Figure 5:
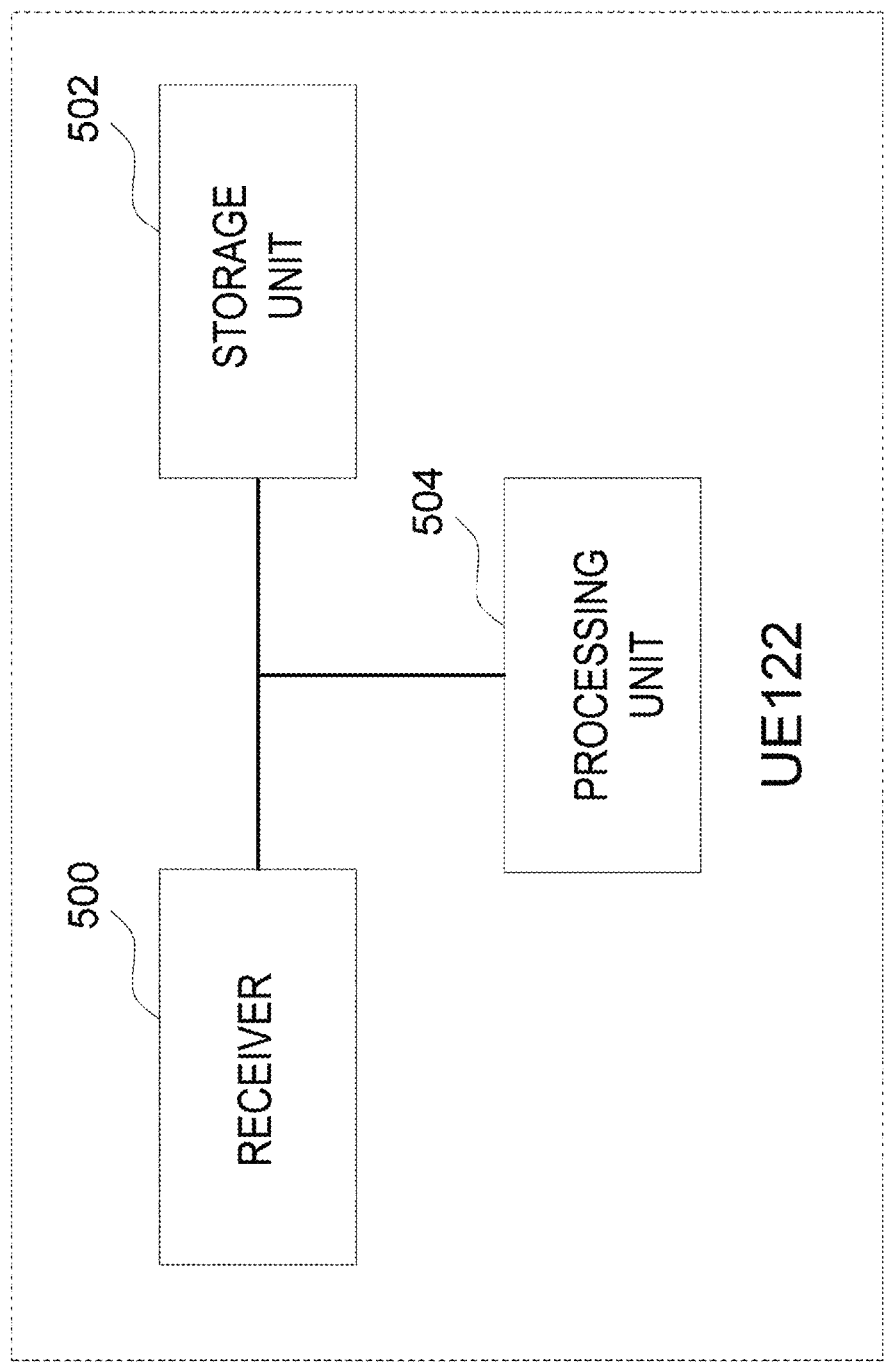
FIG. 5 is a block diagram illustrating a configuration of a terminal apparatus according to embodiments of the present invention.

FIG. 5 is a block diagram illustrating a configuration of a terminal apparatus (UE 122) according to embodiments of the present invention. Note that FIG. 5 illustrates only main components closely related to the present invention in order to avoid complicated explanation.

The UE 122 illustrated in FIG. 5 includes a receiver 500 configured to receive RRC reconfiguration messages from the gNB 108, a storage unit 502 configured to store mapping rules between QoS flows and DRBs, and a processing unit 504 configured to process messages and data.

FIG. 6 is an example of information related to DRB configuration involved in SDAP configuration, and Abstract Syntax Notation One (ASN.1) description of information, among the information included in the RRC reconfiguration message in FIG. 4. The specifications related to RRC (NPL 4 and NPL 10) in the 3GPP describe messages, information (Information Element or IE), and the like related to RRC by using ASN.1. In the example of ASN.1 of FIG. 6, <omitted> or <partly omitted> indicates that not part of the description of ASN.1, but other pieces of information are omitted. Note that there may also be omitted information in parts where neither <omitted> nor <partly omitted> is indicated. Note that the example of ASN.1 in FIG. 6 does not exactly follow the description method of ASN.1, but is a description of an example of parameters of SDAP configuration according to the present invention, and other names or other descriptions may be used. The example of ASN.1 in FIG. 6 only illustrates examples about main information closely related to the present invention in order to avoid complicated explanation.

The information represented by DRB-ToAddModList in FIG. 6 may be a list of information indicating configuration of DRBs to be added or modified, represented by DRB-ToAddMod. The information represented by pduSession-Identity in DRB-ToAddMod (information indicating configuration of DRBs to be added or modified) may be information identifying a PDU session described in NPL 2. The information identifying a PDU session may be a PDU session identifier described in NPL 2 or may be other information. In the example of FIG. 6, the information identifying a PDU session is an integer value from 1 to 16, but may take another value. The information identifying a PDU session may be used to identify a PDU session associated with a DRB to be configured. In FIG. 6, the information identifying a PDU session is included in information indicating configuration of DRBs to be added or modified, but may be described elsewhere. The information represented by DRB-Identity in the information indicating configuration of DRBs to be added or modified is a DRB identity of a DRB to be added or modified. In the example of FIG. 6, the information represented by DRB-Identity is an integer value from 1 to 32, but may take another value. The DRB identity may be used to uniquely identify a DRB in a PDU session.

In FIG. 6, the information represented by sdap-Config in the information indicating configuration of DRBs to be added or modified may be information related to SDAP entity configuration. The information represented by qosFlowIdAddList in the information related to SDAP entity configuration may be list information of QoS flow identifiers (QoSFlow-Identity) corresponding (mapping) to DRB identities. The QoS flow identifiers corresponding (mapping) to DRBs may be correspondence (mapping) in the uplink direction. A QoS flow identifier may be an integer value. The information represented by qosFlowIdReleaseList in the information related to SDAP entity configuration may be list information of QoS flow identifiers (QoSFlow-Identity) to be released from among QoS flow identifiers corresponding (mapping) to DRB identities.

The information represented by sdapHeader-UL may be information indicating that an SDAP header for uplink is present in SDAP PDUs in the uplink direction corresponding (mapping) to DRBs to be configured. The information indicating that an SDAP header for uplink is present may be translated in that an SDAP header for uplink is necessary in SDAP PDUs or SDAP SDUs in the uplink direction corresponding (mapping) to DRBs to be configured. The information represented by sdapHeader-DL may be information indicating that an SDAP header for downlink is present in SDAP PDUs in the downlink direction corresponding (mapping) to DRBs to be configured. The information indicating that an SDAP header for uplink is present, and the information indicating that an SDAP header for uplink is present may indicate that it is present by using true, enable, or the like, or may indicate that it is present with a numerical value representing a header length.

The information represented by reflective may be information indicating that DRBs to be configured correspond (mapping) to reflective QoS flows described in NPL 2 and NPL 16. The information indicating that DRBs to be configured correspond (mapping) to reflective QoS flows may indicate that DRBs to be configured correspond (mapping) to reflective QoS flows by using true, enable, or the like. Note that in each embodiment of the present invention, a QoS flow may include one or more Service Data Flows (SDFs) that are processed by the same QoS policy (NPL 2). Note that a reflective QoS flow may indicate a QoS flow in which a Reflective QoS Indicator (RQI) for being handled as a reflective QoS is included in an encapsulated header (N3 header) of user data of a core network of each packet of one or more SDFs among SDFs assigned to QoS flows.

The information indicated by default may be information indicating that DRBs to be added or modified are default DRBs. The default DRBs may be DRBs corresponding to QoS flows with a default QoS policy, or may be DRBs mapped in a case that mapping rules between QoS flows and DRBs corresponding to uplink SDAP SDUs are not stored. The information indicating that DRBs to be added or modified are default DRBs may indicate that DRBs to be added or modified are default DRBs by using true, enable, and the like.

The information indicated by DRB-ToReleaseList may be information indicating a list of DRB identities of DRBs to be released.

Some or all of the information illustrated in FIG. 6 may be optional. In other words, the information illustrated in FIG. 6 may be included in an RRC reconfiguration message as necessary. Different processing may be defined as processing of the UE 122 in cases that the information is included or not included in an RRC reconfiguration message. For example, the information indicating that an SDAP header for uplink is present, the information indicating that an SDAP header for downlink is present, the information indicating that DRBs to be configured correspond (mapping) to reflective QoS flows, the information indicating that DRBs to be added or modified are default DRBs, and the like may be optional.

The information illustrated in FIG. 6 may include information having dependencies. For example, in a case that the number of QoS flow identifiers included in list information of QoS flow identifiers (QoSFlow-Identity) corresponding (mapping) to DRB identities is two or more, or the number of QoS flows corresponding (mapping) to one DRB is two or more, it may mean that information is present which indicates that an SDAP header for uplink is present. Even in a case that the number of QoS flows corresponding (or mapping) to one DRB is two or more, it may mean that a case of default DRBs is excluded, that is, an SDAP header for uplink is not present. Conversely, it may mean that, in a case of default DRBs, an SDAP header for uplink is present.

For example, in a case that information indicating that DRBs to be configured correspond (mapping) to reflective QoS flows is included in an RRC reconfiguration message, it may mean that information is present which indicates that an SDAP header for downlink is present.

Note that the information indicating that an SDAP header for downlink is present may be information indicating that DRBs to be configured correspond (mapping) to reflective QoS flows. In other words, in a case that the information indicating that an SDAP header for downlink is present in an RRC reconfiguration message, it may indicate that an SDAP header for downlink is present, and DRBs to be configured correspond (mapping) to reflective QoS flows.

Figure 7:
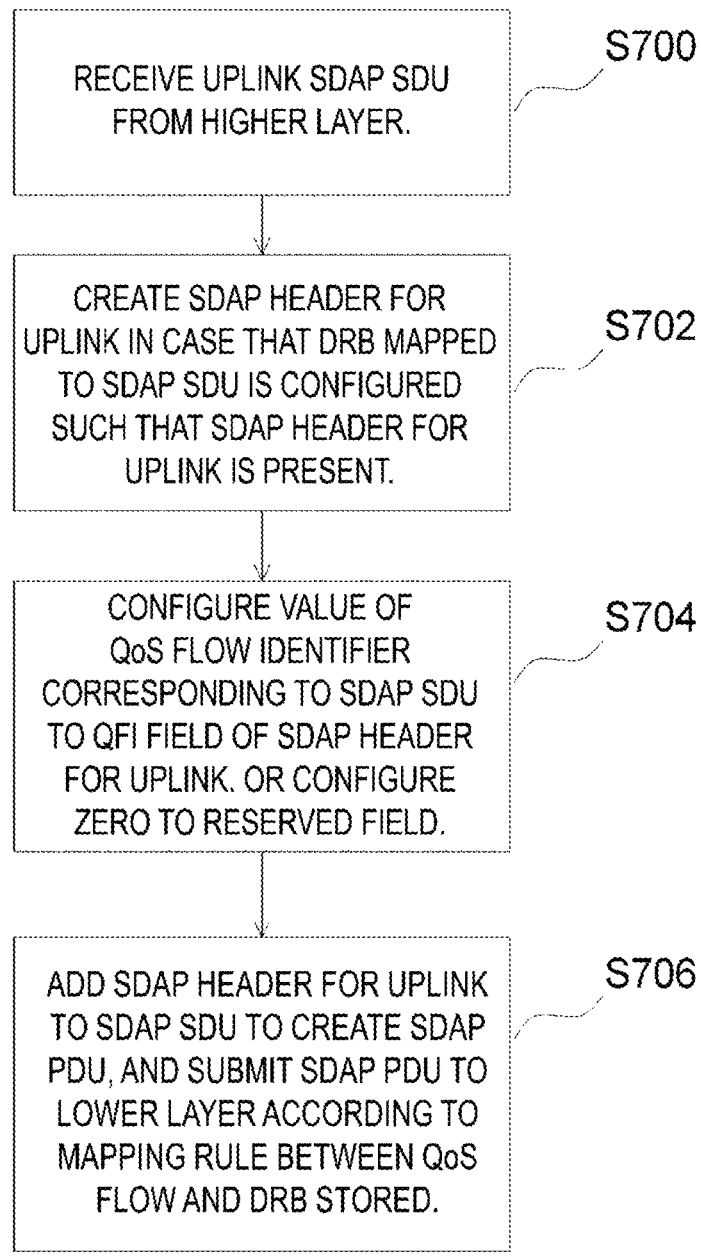
FIG. 7 is an example of a processing method according to Embodiment 1 of the present invention.

FIG. 7 illustrates an example of a processing method of the processing unit 504 of the UE 122 in FIG. 5, according to Embodiment 1 of the present invention.

Figure 8:
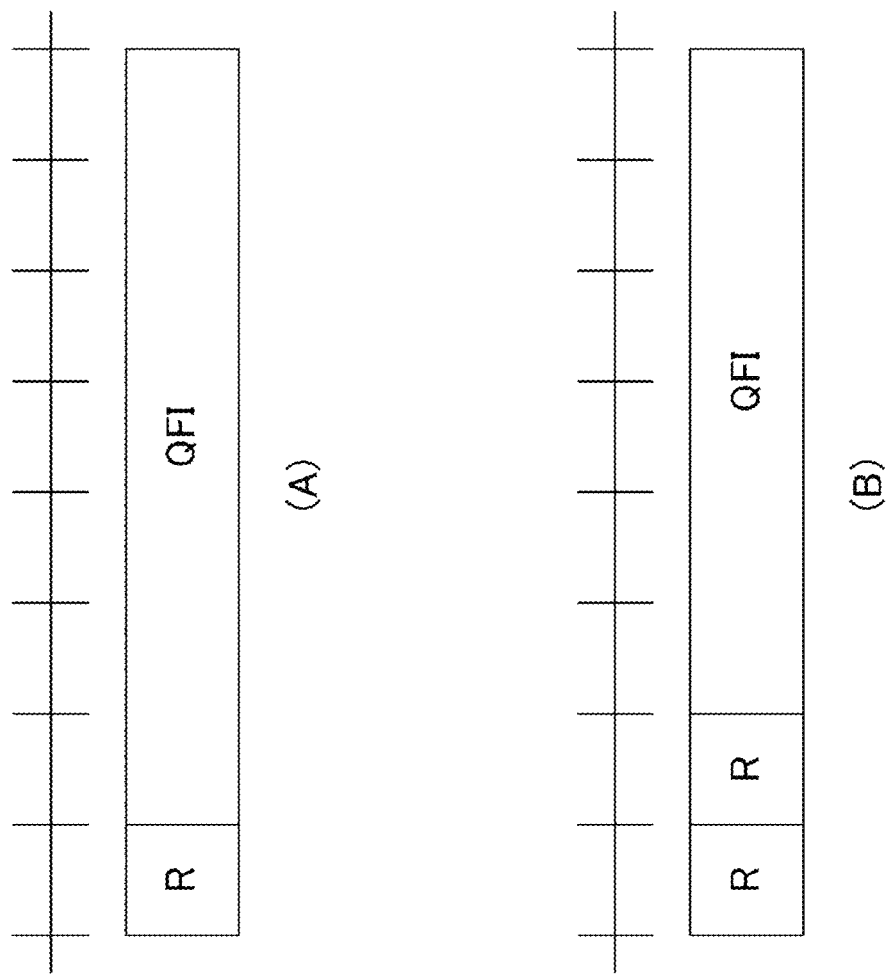
FIG. 8 is an example of an SDAP header for uplink according to Embodiment 1 of the present invention.

FIG. 8 illustrates an example of an SDAP header for uplink according to Embodiment 1 of the present invention.

Next, an example of a DRB configuration procedure including SDAP configuration in an RRC reconfiguration procedure will be described with reference to FIG. 4 to FIG. 8.

The receiver 500 of the UE 122 receives an RRC reconfiguration message from the gNB 108 (step S400). The processing unit 504 of the UE 122 performs configuration in accordance with information included in the RRC reconfiguration message (step S402). The RRC reconfiguration message in Embodiment 1 of the present invention includes information indicating that an SDAP header for uplink is present in information related to SDAP entity configuration. In a case that DRB identities and list information of QoS flow identifiers corresponding (mapping) to DRB identities are included in the RRC reconfiguration message, the processing unit 504 of the UE 122 creates mapping rules between QoS flows corresponding to the QoS flow identifiers for uplink and DRBs having the DRB identities to store in the storage unit 502. At this time, the processing unit 504 of the UE 122 may notify higher layers of information of storing, together with the QoS flow identifiers. In a case that the RRC reconfiguration message includes list information of QoS flow identifiers to be released, the processing unit 504 of the UE 122 releases mapping rules between QoS flows for uplink and DRBs stored in the storage unit 502, corresponding (mapping) to QoS flow identifiers included in the list information of the QoS flow identifiers to be released. At this time, the processing unit 504 of the UE 122 may notify higher layers of information of releasing, together with the QoS flow identifiers. In a case that the RRC reconfiguration message includes list information of DRB identities to be released, the processing unit 504 of the UE 122 releases mapping rules between QoS flows for uplink and DRBs stored in the storage unit 502, corresponding (mapping) to DRB identities included in the list information of the DRB identities to be released. At this time, the processing unit 504 of the UE 122 may notify higher layers of information of releasing, together with the QoS flow identifiers.

Next, the processing unit 504 of the UE 122 receives an SDAP SDU and a QoS Flow Identifier (QFI) of a QoS flow corresponding (mapping) to the SDAP SDU from a higher layer (step S700).

Next, the processing unit 504 of the UE 122 checks whether or not the DRB mapped to the SDAP SDU received from the higher layer is a DRB configured such that an SDAP header for uplink is present, and in a case that the DRB is configured such that an SDAP header for uplink is present, creates an SDAP header for uplink (step S702).

FIGS. 8(A) and 8(B) are examples of formats of an SDAP header for uplink according to Embodiment 1 of the present invention. FIGS. 8(A) and 8(B) both include a QFI field and R fields (R bits). The R field (R bits) is a reserved field (reserved bits). In FIG. 8(A), there is one 1-bit length R field, whereas there is one 7-bit length QFI field. In FIG. 8(B), there are two 1-bit length R fields (or one 2-bit length R field), while there is one 6-bit length QFI field. Note that the format of an SDAP header for uplink is not always as this format, but, for example, instead of the R field, there may be a reflective indicator field (RQI field). There may also be other fields or bits, for example, fields or bits indicating that there are no mapping rules between QoS flows and DRBs corresponding to SDAP PDUs received from a higher layer.

Next, the processing unit 504 of the UE 122 configures the QFI of the QoS flow corresponding to the SDAP PDU received from the higher layer in step S700, to the QFI field of the SDAP header for uplink. The processing unit 504 of the UE 122 may set zero ('0') to the reserved field of the SDAP header for uplink (step S704). Note that in a case that an RQI field is present in the SDAP header for uplink, the processing unit 504 of the UE 122 may set zero ('0') to the RQI field.

Next, the processing unit 504 of the UE 122 adds the SDAP header for uplink generated in step S702 and step S704 to the SDAP SDU received from the higher layer in step S700 to create an SDAP PDU, and submits the SDAP PDU to a lower layer according to mapping rules between QoS flows and DRBs stored in the storage unit 502. Note that the order of storing values to each field of an SDAP header for uplink from step S700 to step S706 and adding an SDAP header for uplink to an SDAP SDU may not be this order. Note that in a case that the SDAP header for uplink is not configured to be present in step S702, an SDAP header for uplink may not be created, and the SDAP SDU received from the higher layer may be submitted as is, as an SDAP PDU to a lower layer.

As described above, in Embodiment 1 of the present invention, the terminal apparatus can perform efficient communication by transmitting and/or receiving necessary information such as QoS flow identifier information between higher layers and radio access layer to correctly managing QoS.

Embodiment 2

Embodiment 2 of the present invention will be described with reference to FIG. 1, and FIG. 4 to FIG. 6, and FIG. 9. FIG. 4 to FIG. 6 are the same as in Embodiment 1 of the present invention.

In other words, FIG. 4 is a diagram illustrating an example of a flow of an RRC reconfiguration procedure according to each embodiment of the present invention.

The RRC Reconfiguration procedure includes procedures used for handover and Mesurement and the like, in addition to establishment, change, and release of RBs, and change, release, and the like of secondary cells in NR as disclosed in NPL 10. According to each embodiment of the present invention, procedures used for establishment, change, and release of RBs, addition, change, and release of cell groups, handover and Mesurement, and the like in NR may be referred to as RRC reconfiguration procedures, or may have another designation. The procedures used for establishment, change, and release of RBs, addition, change, and release of cell groups, handover and Mesurement, and the like according to each embodiment of the present invention may be procedures in E-UTRA according to NPL 4, or may be referred to as RRC connection reconfiguration procedures.

In an RRC reconfiguration procedure, the UE 122 receives an RRC reconfiguration message (RRCReconfigration) from the gNB 108 (step S400), and performs various configurations according to information included in the RRC reconfiguration message, such as configuration of DRBs (step S402). After step S402, the UE 122 may transmit an RRC reconfiguration complete message (RRCReconfigrationComplete) and the like to the gNB 108 (not illustrated).

FIG. 5 is a block diagram illustrating a configuration of a terminal apparatus (UE 122) according to each embodiment of the present invention. Note that FIG. 5 illustrates only main components closely related to the present invention in order to avoid complicated explanation.

The UE 122 illustrated in FIG. 5 includes a receiver 500 configured to receive RRC reconfiguration messages from the gNB 108, a storage unit 502 configured to store mapping rules between QoS flows and DRBs, and a processing unit 504 configured to process messages and data.

FIG. 6 is an example of information related to DRB configuration involved in SDAP configuration, and Abstract Syntax Notation One (ASN.1) description of information, among the information included in the RRC reconfiguration message in FIG. 4. The specifications related to RRC (NPL 4 and NPL 10) in the 3GPP describe messages, information (Information Element or IE), and the like related to RRC by using ASN.1. In the example of ASN.1 of FIG. 6, <omitted> or <partly omitted> indicates that not part of the description of ASN.1, but other pieces of information are omitted. Note that there may also be omitted information in parts where neither <omitted> nor <partly omitted> is indicated. Note that the example of ASN.1 in FIG. 6 does not exactly follow the description method of ASN.1, but is a description of an example of parameters of SDAP configuration according to the present invention, and other names or other descriptions may be used. The example of ASN.1 in FIG. 6 only illustrates examples about main information closely related to the present invention in order to avoid complicated explanation.

The information represented by DRB-ToAddModList in FIG. 6 may be a list of information indicating configuration of DRBs to be added or modified, represented by DRB-ToAddMod. The information represented by pduSession-Identity in DRB-ToAddMod (information indicating configuration of DRB to be added or modified) may be information identifying a PDU session described in NPL 2. The information identifying a PDU session may be a PDU session identifier described in NPL 2 or may be other information. In the example of FIG. 6, the information identifying a PDU session is an integer value from 1 to 16, but may take another value. The information identifying a PDU session may be used to identify a PDU session associated with a DRB to be configured. In FIG. 6, the information identifying a PDU session is included in information indicating configuration of DRB to be added or modified, but may be described elsewhere. The information represented by DRB-Identity in the information indicating configuration of DRB to be added or modified is a DRB identity of a DRB to be added or modified. In the example of FIG. 6, the information represented by DRB-Identity is an integer value from 1 to 32, but may take another value. The DRB identity may be used to uniquely identify a DRB in a PDU session.

In FIG. 6, the information represented by sdap-Config in the information indicating configuration of DRB to be added or modified may be information related to SDAP entity configuration. The information represented by qosFlow-IdAddList in the information related to SDAP entity configuration may be list information of QoS flow identifiers (QoSFlow-Identity) corresponding (mapping) to DRB identity. The QoS flow identifiers corresponding (mapping) to DRB may be correspondence (mapping) in the uplink direction. A QoS flow identifier may be an integer value. The information represented by qosFlowIdReleaseList in the information related to SDAP entity configuration may be list information of QoS flow identifiers (QoSFlow-Identity) to be released from among QoS flow identifiers corresponding (mapping) to DRB identity.

The information represented by sdapHeader-UL may be information indicating that an SDAP header for uplink is present in SDAP PDUs in the uplink direction corresponding (mapping) to DRB to be configured. The information indicating that an SDAP header for uplink is present may be translated in that an SDAP header for uplink is necessary in SDAP PDUs or SDAP SDUs in the uplink direction corresponding (mapping) to DRB to be configured. The information represented by sdapHeader-DL may be information indicating that an SDAP header for downlink is present in SDAP PDUs in the downlink direction corresponding (mapping) to DRB to be configured. The information indicating that an SDAP header for uplink is present, and the information indicating that an SDAP header for uplink is present may indicate that it is present by using true, enable, or the like, or may indicate that it is present with a numerical value representing a header length.

The information represented by reflective may be information indicating that DRB to be configured correspond (mapping) to reflective QoS flows described in NPL 2 and NPL 16. The information indicating that DRB to be configured correspond (mapping) to reflective QoS flows may indicate that DRB to be configured correspond (mapping) to reflective QoS flows by using true, enable, or the like. Note that in each embodiment of the present invention, a QoS flow may include one or more Service Data Flows (SDFs) that are processed by the same QoS policy (NPL 2). Note that a reflective QoS flow may indicate a QoS flow in which a Reflective QoS Indicator (RQI) for being handled as a reflective QoS is included in an encapsulated header (N3 header) of user data of a core network of each packet of one or more SDFs among SDFs assigned to QoS flows.

The information indicated by default may be information indicating that DRB to be added or modified are default DRB. The default DRB may be DRB corresponding (mapping) to QoS flows with a default QoS policy, or may be DRB mapped in a case that mapping rules between QoS flows and DRB corresponding to uplink SDAP SDUs are not stored. The information indicating that DRB to be added or modified are default DRB may indicate that DRB to be added or modified are default DRB by using true, enable, and the like.

The information indicated by DRB-ToReleaseList may be information indicating a list of DRB identities of DRBs to be released.

Some or all of the information illustrated in FIG. 6 may be optional. In other words, the information illustrated in FIG. 6 may be included in an RRC reconfiguration message as necessary. Different processing may be defined as processing of the UE 122 in cases that the information is included or not included in an RRC reconfiguration message. For example, the information indicating that an SDAP header for uplink is present, the information indicating that an SDAP header for downlink is present, the information indicating that DRB to be configured correspond (mapping) to reflective QoS flows, the information indicating that DRB to be added or modified are default DRB, and the like may be optional.

The information illustrated in FIG. 6 may include information having dependencies. For example, in a case that the number of QoS flow identifiers included in list information of QoS flow identifiers (QoSFlow-Identity) corresponding (mapping) to DRB identities is two or more, or the number of QoS flows corresponding (mapping) to one DRB is two or more, it may mean that information is present which indicates that an SDAP header for uplink is present. Even in a case that the number of QoS flows corresponding (or mapping) to one DRB is two or more, it may mean that a case of default DRB is excluded, that is, an SDAP header for uplink is not present. Conversely, it may mean that, in a case of default DRB, an SDAP header for uplink is present.

For example, in a case that information indicating that DRB to be configured correspond (mapping) to reflective QoS flows is included in an RRC reconfiguration message, it may mean that information is present which indicates that an SDAP header for downlink is present.

Note that the information indicating that an SDAP header for downlink is present may be information indicating that DRB to be configured correspond (mapping) to reflective QoS flows. In other words, in a case that the information indicating that an SDAP header for downlink is present in an RRC reconfiguration message, it may indicate that an SDAP header for downlink is present, and DRB to be configured correspond (mapping) to reflective QoS flows.

Figure 9:
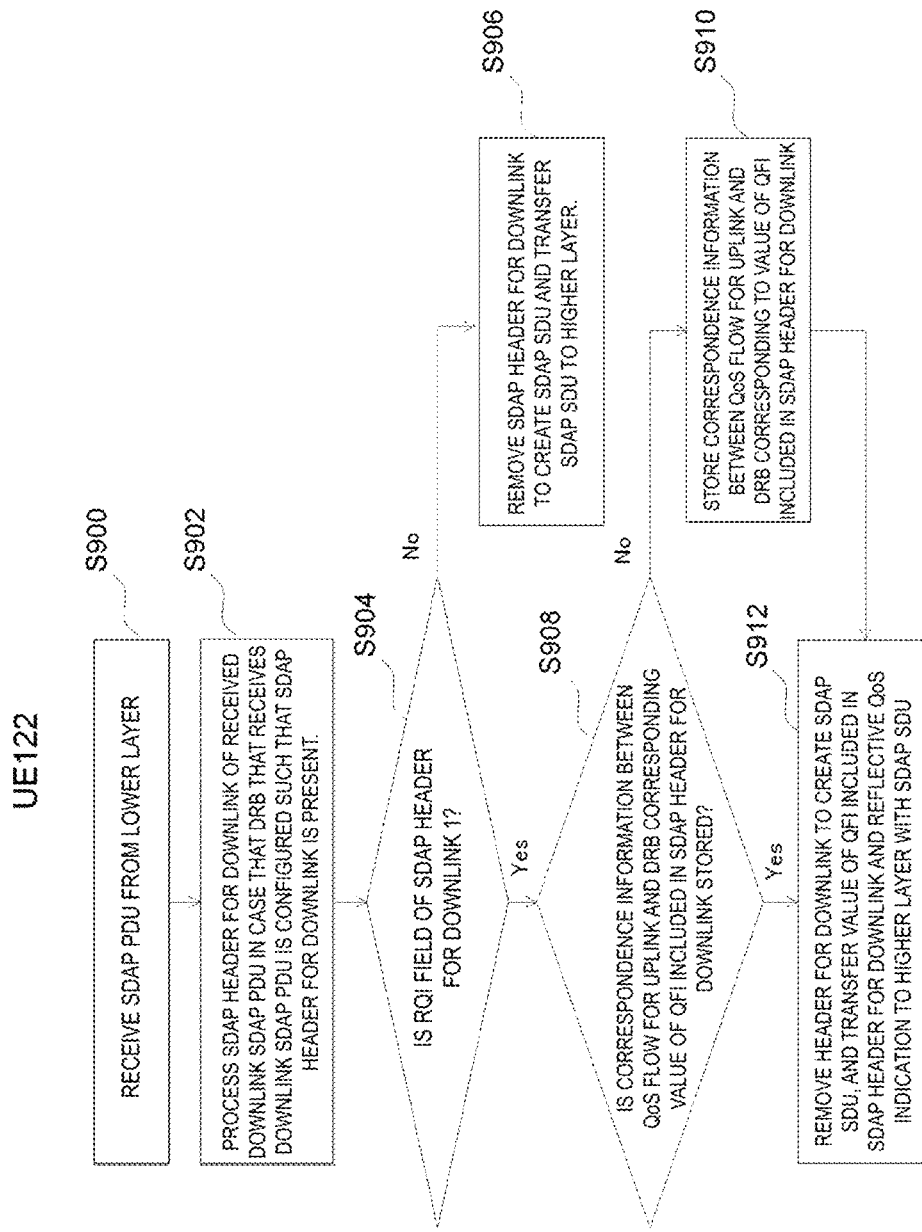
FIG. 9 is an example of a processing method according to Embodiment 2 of the present invention.

FIG. 9 illustrates an example of a processing method of the processing unit 504 of the UE 122 in FIG. 5, according to Embodiment 2 of the present invention.

Next, an example of a DRB configuration procedure including SDAP configuration in an RRC reconfiguration procedure according to Embodiment 2 of the present invention will be described with reference to FIG. 4 to FIG. 6 and FIG. 9.

The receiver 500 of the UE 122 receives an RRC reconfiguration message from the gNB 108 (step S400). The processing unit 504 of the UE 122 performs configuration in accordance with information included in the RRC reconfiguration message (step S402). The RRC reconfiguration message in Embodiment 2 of the present invention includes information indicating corresponding (mapping) to reflective QoS flows, information indicating that an SDAP header for downlink is present, or information indicating corresponding (mapping) to reflective QoS flows and information indicating that an SDAP header for downlink is present, in the information related to SDAP entity configuration. In a case that DRB identities and list information of QoS flow identifiers corresponding (mapping) to DRB identities are included in the RRC reconfiguration message, the processing unit 504 of the UE 122 creates mapping rules between QoS flows corresponding to the QoS flow identifiers for uplink and DRBs having the DRB identities to store in the storage unit 502. At this time, the processing unit 504 of the UE 122 may notify higher layers of information of storing, together with the QoS flow identifiers. In a case that the RRC reconfiguration message includes list information of QoS flow identifiers to be released, the processing unit 504 of the UE 122 releases mapping rules between QoS flows for uplink and DRBs stored in the storage unit 502, corresponding (mapping) to QoS flow identifiers included in the list information of the QoS flow identifiers to be released. At this time, the processing unit 504 of the UE 122 may notify higher layers of information of releasing, together with the QoS flow identifiers. In a case that the RRC reconfiguration message includes list information of DRB identities to be released, the processing unit 504 of the UE 122 releases mapping rules between QoS flows for uplink and DRBs stored in the storage unit 502, corresponding (mapping) to DRB identities included in the list information of the DRB identities to be released. At this time, the processing unit 504 of the UE 122 may notify higher layers of information of releasing, together with the QoS flow identifiers.

Next, the processing unit 504 of the UE 122 receives a downlink SDAP PDU from a lower layer (step S900).

Next, the processing unit 504 of the UE 122 checks whether or not the DRB that receives the downlink SDAP PDU is configured such that an SDAP header for downlink is present, and in a case that the DRB is configured such that an SDAP header for downlink is present, processes the SDAP header for downlink of the received downlink SDAP PDU (step S902).

Next, the processing unit 504 of the UE 122 checks whether the field of the RQI of the SDAP header for downlink is a value ('1') indicating that the reflective QoS indication is action (step S904). In a case that the RQI field is a value ('0') indicating reflective QoS indication non-action, the processing unit 504 of the UE 122 removes the SDAP header for downlink from the downlink SDAP PDU received from the lower layer in step S900 to create an SDAP SDU and transfer the SDAP SDU to a higher layer (step S906).

In a case that the field of the RQI of the SDAP header for downlink is 1 in step S902, the processing unit 504 of the UE 122 further checks whether or not a mapping rule between a QoS flow for uplink and a DRB corresponding to a value of a QFI included in an SDAP header for downlink is stored in the storage unit 502 (step S908). In a case that the mapping rule is stored in the storage unit 502, the processing unit 504 of the UE 122 removes the header for downlink from the SDAP PDU received from the lower layer in step S900 to create an SDAP SDU, and transfers the value of the QFI included in the SDAP header for downlink and information indicating reflective indication action (RQI=1) to a higher layer along with the SDAP SDU (step S912). Here, by transferring the value of the QFI included in the SDAP header for downlink to the higher layer along with the SDAP SDU, it may also serve to transfer information of a reflective indication.

In a case that a mapping rule between a QoS flow for uplink and a DRB corresponding to a value of a QFI included in an SDAP header for downlink are not stored in the storage unit 502 in step S908, the processing unit 504 of the UE 122 stores a mapping rule between a QoS flow for uplink and a DRB corresponding to the value of the QFI included in the SDAP header for downlink in the storage unit 502 (step S910), and removes the header for downlink from the SDAP PDU for downlink received from the lower layer in step S900 to create an SDAP SDU, and transfers the value of the QFI included in the SDAP header for downlink and the information of reflective indication to a higher layer along with the SDAP SDU (step S912). Here, by transferring the value of the QFI included in the SDAP header for downlink to the higher layer along with the SDAP SDU, it may also serve to transfer information of a reflective indication.

Note that, from step S900 to step S912, the order of removing an SDAP header for downlink from an SDAP PDU to generate an SDAP SDU, the order for analyzing a field of a downlink SDAP header, and the order of storing a mapping rule between a QoS flow for uplink and a DRB corresponding to a value of a QFI included in an SDAP header for downlink in the storage unit 502 may not as those illustrated. Note that in a case that an SDAP header for downlink is not configured to be present in step S902, the processing unit 504 of the UE 122 may pass the SDAP PDU for downlink received from the lower layer as is, as an SDAP SDU to a higher layer.

Note that, instead of checking whether or not a mapping rule between a QoS flow for uplink and a DRB corresponding to a value of a QFI included in the SDAP header for downlink is stored in the storage unit 502 in step S908, the processing unit 504 of the UE 122 may check whether or not a mapping rule between a QoS flow for uplink and a DRB corresponding to a value of a QFI included in the SDAP header stored in the storage unit 502 is active. At this time, in a case that a mapping rule between a QoS flow for uplink and a DRB corresponding to a value of a QFI included in the SDAP header for downlink stored in the storage unit 502 is not active, then, instead of storing a mapping rule for a QoS flow for uplink and a DRB corresponding to a value of a QFI included in the SDAP header for downlink in the storage unit 502, the processing unit 504 of the UE 122 may activate a mapping rule between a QoS flow for uplink and a DRB corresponding to a value of a QFI included in the SDAP header for downlink stored in the storage unit 502 in step S910.

As described above, in Embodiment 2 of the present invention, the terminal apparatus can perform efficient communication by transmitting and/or receiving necessary information such as QoS flow identifier information and reflective QoS indication information between higher layers and radio access layer to correctly managing QoS.

Embodiment 3

Embodiment 3 of the present invention will be described with reference to FIG. 1, FIG. 4, FIG. 6, and FIG. 10 to FIG. 13. FIG. 4 and FIG. 6 are the same as in Embodiment 1 of the present invention and Embodiment 2 of the present invention.

In other words, FIG. 4 is a diagram illustrating an example of a flow of an RRC reconfiguration procedure according to each embodiment of the present invention.

The RRC Reconfiguration procedure includes procedures used for handover and Mesurement and the like, in addition to establishment, change, and release of RBs, and change, release, and the like of secondary cells in NR as disclosed in NPL 10. According to each embodiment of the present invention, procedures used for establishment, change, and release of RBs, addition, change, and release of cell groups, handover and Mesurement, and the like in NR may be referred to as RRC reconfiguration procedures, or may have another designation. The procedures used for establishment, change, and release of RBs, addition, change, and release of cell groups, handover and Mesurement, and the like according to each embodiment of the present invention may be procedures in E-UTRA according to NPL 4, or may be referred to as RRC connection reconfiguration procedures.

In an RRC reconfiguration procedure, the UE 122 receives an RRC reconfiguration message (RRCReconfigration) from the gNB 108 (step S400), and performs various configurations according to information included in the RRC reconfiguration message, such as configuration of DRBs (step S402). After step S402, the UE 122 may transmit an RRC reconfiguration complete message (RRCReconfigrationComplete) and the like to the gNB 108 (not illustrated).

FIG. 6 is an example of information related to DRB configuration involved in SDAP configuration, and Abstract Syntax Notation One (ASN.1) description of information, among the information included in the RRC reconfiguration message in FIG. 4. The specifications related to RRC (NPL 4 and NPL 10) in the 3GPP describe messages, information (Information Element or IE), and the like related to RRC by using ASN.1. In the example of ASN.1 of FIG. 6, <omitted> or <partly omitted> indicates that not part of the description of ASN.1, but other pieces of information are omitted. Note that there may also be omitted information in parts where neither <omitted> nor <partly omitted> is indicated. Note that the example of ASN.1 in FIG. 6 does not exactly follow the description method of ASN.1, but is a description of an example of parameters of SDAP configuration according to the present invention, and other names or other descriptions may be used. The example of ASN.1 in FIG. 6 only illustrates examples about main information closely related to the present invention in order to avoid complicated explanation.

The information represented by DRB-ToAddModList in FIG. 6 may be a list of information indicating configuration of DRBs to be added or modified, represented by DRB-ToAddMod. The information represented by pduSession-Identity in DRB-ToAddMod (information indicating configuration of DRB to be added or modified) may be information identifying a PDU session described in NPL 2. The information identifying a PDU session may be a PDU session identifier described in NPL 2 or may be other information. In the example of FIG. 6, the information identifying a PDU session is an integer value from 1 to 16, but may take another value. The information identifying a PDU session may be used to identify a PDU session associated with a DRB to be configured. In FIG. 6, the information identifying a PDU session is included in information indicating configuration of DRB to be added or modified, but may be described elsewhere. The information represented by DRB-Identity in the information indicating configuration of DRB to be added or modified is a DRB identity of a DRB to be added or modified. In the example of FIG. 6, the information represented by DRB-Identity is an integer value from 1 to 32, but may take another value. The DRB identity may be used to uniquely identify a DRB in a PDU session.

In FIG. 6, the information represented by sdap-Config in the information indicating configuration of DRB to be added or modified may be information related to SDAP entity configuration. The information represented by qosFlow-IdAddList in the information related to SDAP entity configuration may be list information of QoS flow identifiers (QoSFlow-Identity) corresponding (mapping) to DRB identities. The QoS flow identifiers corresponding (mapping) to DRB may be correspondence (mapping) in the uplink direction. A QoS flow identifier may be an integer value. The information represented by qosFlowIdReleaseList in the information related to SDAP entity configuration may be list information of QoS flow identifiers (QoSFlow-Identity) to be released from among QoS flow identifiers corresponding (mapping) to DRB identities.

The information represented by sdapHeader-UL may be information indicating that an SDAP header for uplink is present in SDAP PDUs in the uplink direction corresponding (mapping) to DRB to be configured. The information indicating that an SDAP header for uplink is present may be translated in that an SDAP header for uplink is necessary in SDAP PDUs or SDAP SDUs in the uplink direction corresponding (mapping) to DRB to be configured. The information represented by sdapHeader-DL may be information indicating that an SDAP header for downlink is present in SDAP PDUs in the downlink direction corresponding (mapping) to DRB to be configured. The information indicating that an SDAP header for uplink is present, and the information indicating that an SDAP header for uplink is present may indicate that it is present by using true, enable, or the like, or may indicate that it is present with a numerical value representing a header length.

The information represented by reflective may be information indicating that DRB to be configured correspond (mapping) to reflective QoS flows described in NPL 2 and NPL 16. The information indicating that DRB to be configured correspond (mapping) to reflective QoS flows may indicate that DRB to be configured correspond (mapping) to reflective QoS flows by using true, enable, or the like. Note that in each embodiment of the present invention, a QoS flow may include one or more Service Data Flows (SDFs) that are processed by the same QoS policy (NPL 2). Note that a reflective QoS flow may indicate a QoS flow in which a Reflective QoS Indicator (RQI) for being handled as a reflective QoS is included in an encapsulated header (N3 header) of user data of a core network of each packet of one or more SDFs among SDFs assigned to QoS flows.

The information indicated by default may be information indicating that DRBs to be added or modified are default DRB. The default DRB may be DRB corresponding (mapping) to QoS flows with a default QoS policy, or may be DRB mapped in a case that mapping rules between QoS flows and DRB corresponding (mapping) to uplink SDAP SDUs are not stored. The information indicating that DRB to be added or modified are default DRB may indicate that DRB to be added or modified are default DRB by using true, enable, and the like.

The information indicated by DRB-ToReleaseList may be information indicating a list of DRB identities of DRBs to be released.

Some or all of the information illustrated in FIG. 6 may be optional. In other words, the information illustrated in FIG. 6 may be included in an RRC reconfiguration message as necessary. Different processing may be defined as processing of the UE 122 in cases that the information is included or not included in an RRC reconfiguration message. For example, the information indicating that an SDAP header for uplink is present, the information indicating that an SDAP header for downlink is present, the information indicating that DRB to be configured correspond (mapping) to reflective QoS flows, the information indicating that DRB to be added or modified are default DRB, and the like may be optional.

The information illustrated in FIG. 6 may include information having dependencies. For example, in a case that the number of QoS flow identifiers included in list information of QoS flow identifiers (QoSFlow-Identity) corresponding (mapping) to DRB identities is two or more, or the number of QoS flows corresponding (mapping) to one DRB is two or more, it may mean that information is present which indicates that an SDAP header for uplink is present. Even in a case that the number of QoS flows corresponding (or mapping) to one DRB is two or more, it may mean that a case of default DRB is excluded, that is, an SDAP header for uplink is not present. Conversely, it may mean that, in a case of default DRB, an SDAP header for uplink is present.

For example, in a case that information indicating that DRB to be configured correspond (mapping) to reflective QoS flows is included in an RRC reconfiguration message, it may mean that information is present which indicates that an SDAP header for downlink is present.

Note that the information indicating that an SDAP header for downlink is present may be information indicating that DRB to be configured correspond (mapping) to reflective QoS flows. In other words, in a case that the information indicating that an SDAP header for downlink is present in an RRC reconfiguration message, it may indicate that an SDAP header for downlink is present, and DRB to be configured correspond (mapping) to reflective QoS flows.

FIG. 13 is a block diagram illustrating a configuration of a terminal apparatus (UE 122) according to Embodiment 3 of the present invention. Note that FIG. 5 illustrates only main components closely related to the present invention in order to avoid complicated explanation.

The UE 122 illustrated in FIG. 13 includes a receiver 1300 configured to receive an RRC reconfiguration message from the gNB 108, and a processing unit 1302 configured to perform processing in accordance with the RRC reconfiguration request.

Next, a first example of a DRB configuration procedure in an RRC reconfiguration procedure according to Embodiment 3 of the present invention will described with reference to FIG. 4, FIG. 6, FIG. 10, and FIG. 13.

The receiver 1300 of the UE 122 receives an RRC reconfiguration message from the gNB 108 (step S400). The processing unit 1302 of the UE 122 performs configuration in accordance with information included in the RRC reconfiguration request (step S402).

Figure 10:
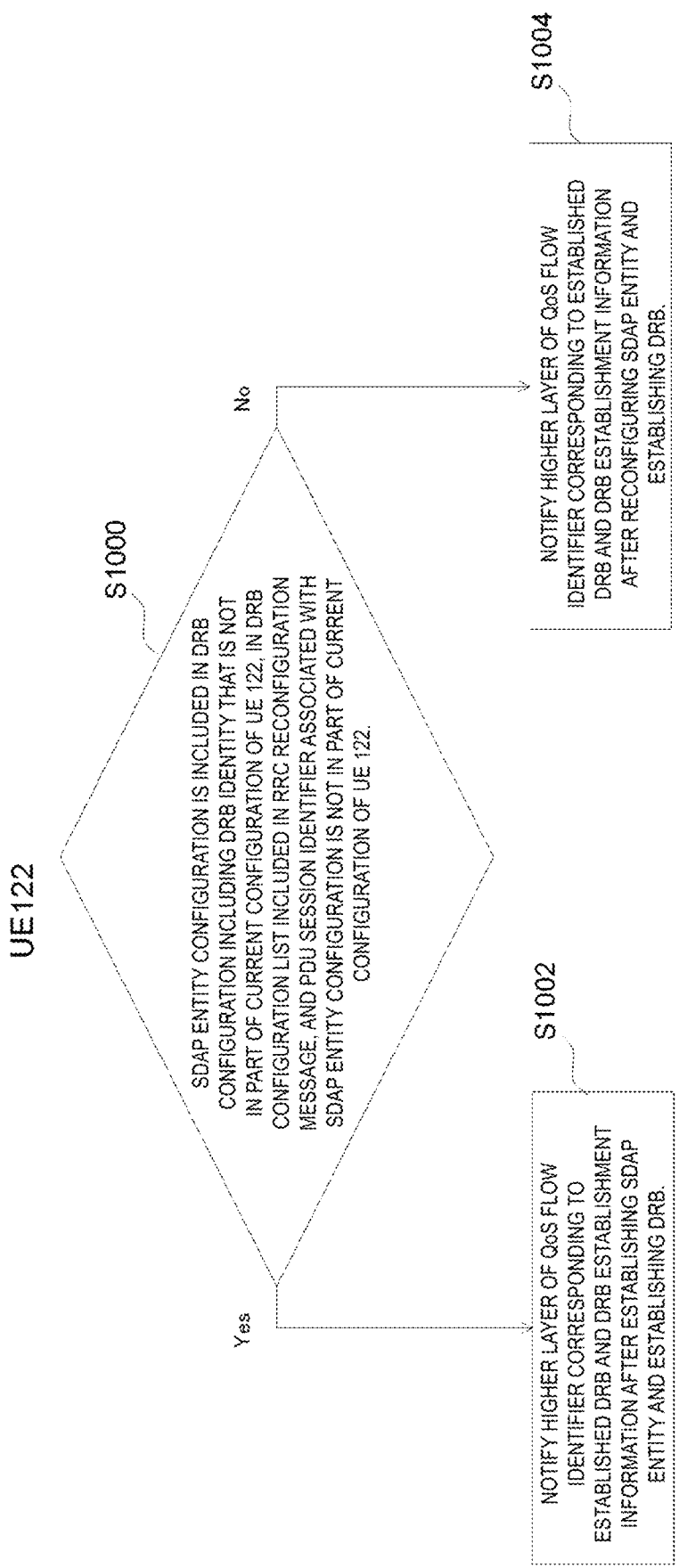
FIG. 10 is a first example of a processing method according to Embodiment 3 of the present invention.

FIG. 10 illustrates a first example of a processing method of the processing unit 1302 of the UE 122, according to Embodiment 3 of the present invention. The processing unit 1302 of the UE 122 checks a case that information related to SDAP entity configuration is included in information indicating configuration of a DRB including a DRB identity that is not in part of the current configuration of the UE 122, in a list of information indicating configuration of a DRB to be added or modified, included in the RRC reconfiguration message received from the receiver 1300, and whether or not information identifying a PDU session such as a PDU session identifier associated with the SDAP entity configuration is present in part of the current configuration of the UE 122 configuration (step S1000). In a case that the information identifying the PDU session is not in part of the current configuration of the UE 122 configuration, after establishing an SDAP entity and performing DRB configuration according to the information indicating the configuration of the DRB to be added or modified, the processing unit 1302 of the UE 122 notifies a higher layer of QoS flow identifiers or a list of QoS flow identifiers corresponding (mapping) to the established DRB, and DRB establishment information (step S1002). At this time, the processing unit 1302 of the UE 122 may notify the information identifying the PDU session together. In a case that the information identifying the PDU session is in part of the current configuration of the UE 122 configuration, after reconfiguring the SDAP entity and performing DRB configuration according to the information indicating the configuration of the DRB to be added or modified, the processing unit 1302 of the UE 122 notifies a higher layer of QoS flow identifiers or a list of QoS flow identifiers corresponding (mapping) to established DRB, and DRB establishment information (step S1004). At this time, the processing unit 1302 of the UE 122 may notify the information identifying the PDU session together.

Next, a second example of a DRB configuration procedure in an RRC reconfiguration procedure according to Embodiment 3 of the present invention will be described with reference to FIG. 4 to FIG. 6 and FIG. 11.

The receiver 1300 of the UE 122 receives an RRC reconfiguration message from the gNB 108 (step S400). The processing unit 1302 of the UE 122 performs configuration in accordance with information included in the RRC reconfiguration request (step S402).

Figure 11:
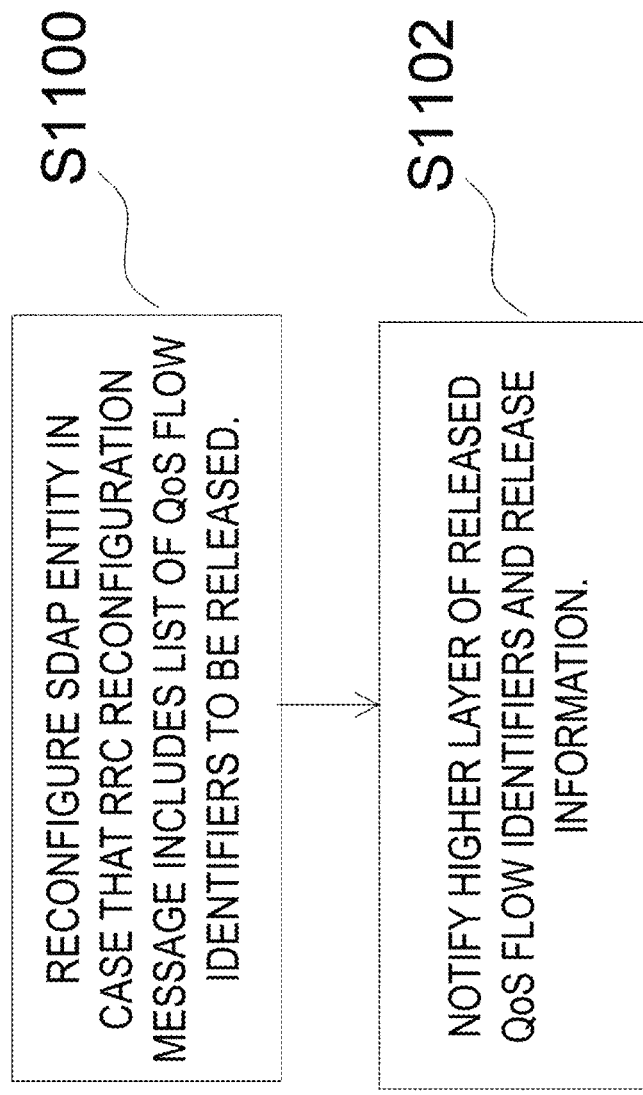
FIG. 11 is a second example of a processing method according to Embodiment 3 of the present invention.

FIG. 11 illustrates a second example of a processing method of the processing unit 1302 of the UE 122, according to Embodiment 3 of the present invention. The processing unit 1302 of the UE 122 checks that the RRC reconfiguration message received from the receiver 1300 includes information related to a list of QoS flow identifiers to be released (step S1100). At this time, the RRC reconfiguration message may include DRB identities corresponding (mapping) to the QoS flow identifiers to be released. Next, the processing unit 1302 of the UE 122 notifies a higher layer of the released QoS flow identifiers included in the list of the QoS flow identifiers released and information of releasing (step S1104). At this time, the processing unit 1302 of the UE 122 may notify information identifying PDU sessions corresponding each of the released QoS flow identifiers together.

Next, a third example of a DRB configuration procedure in an RRC reconfiguration procedure according to Embodiment 3 of the present invention will be described with reference to FIG. 4 to FIG. 6 and FIG. 12.

The receiver 1300 of the UE 122 receives an RRC reconfiguration message from the gNB 108 (step S400). The processing unit 1302 of the UE 122 performs configuration in accordance with information included in the RRC reconfiguration request (step S402).

Figure 12:
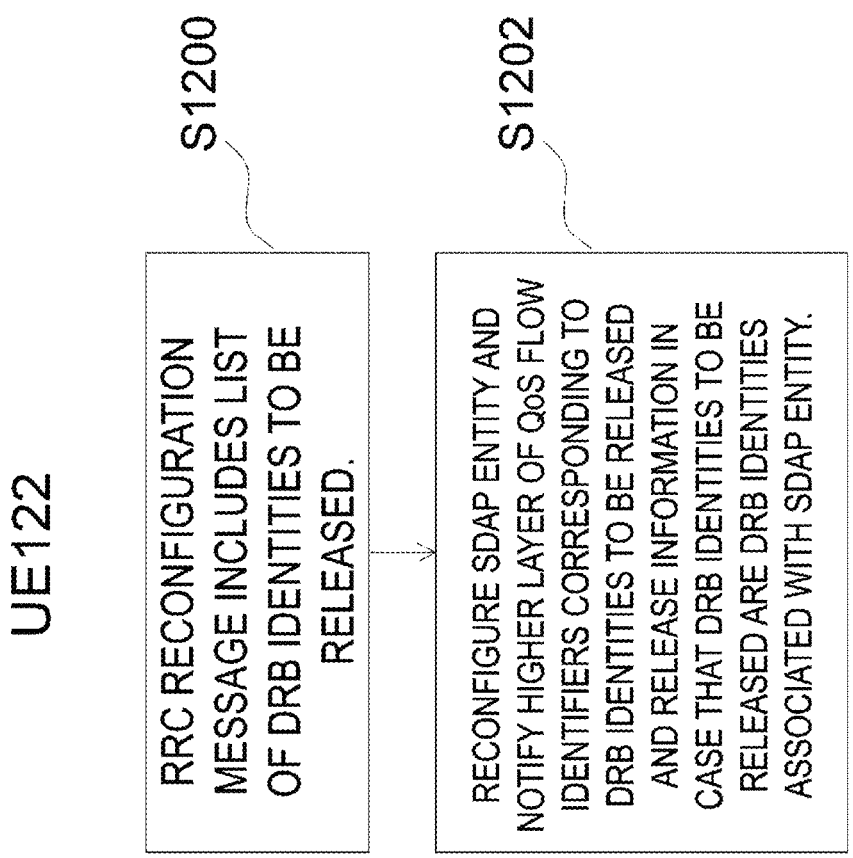
FIG. 12 is a third example of a processing method according to Embodiment 3 of the present invention.

FIG. 12 illustrates a third example of a processing method of the processing unit 1302 of the UE 122, according to Embodiment 3 of the present invention. The processing unit 1302 of the UE 122 checks that the RRC reconfiguration message includes a list of DRB identities to be released (step S1200). Next, the processing unit 1302 of the UE 122 reconfigures the SDAP entity in a case that the DRB identities to be released are DRB identities associated with the SDAP entity, and notifies a higher layer of the QoS flow identifiers corresponding (mapping) to DRBs having the DRB identities to be released, or the list of the QoS identifiers, and the information of releasing (step S1202). At this time, the processing unit 1302 of the UE 122 may notify information identifying PDU sessions corresponding each of the released QoS flow identifiers together. Note that in a case that the DRB identities to be released are not associated with the SDAP entity and are DRB identities associated with EPS bearer identifiers, the EPS bearer identifiers may be notified to a higher layer.

As described above, in Embodiment 3 of the present invention, the terminal apparatus can perform efficient communication by transmitting and/or receiving information of QoS flow identifiers corresponding (mapping) to DRBs between higher layers and the radio access layer to correctly managing QoS.

Note that the DRB configuration according to each embodiment of the present invention may be included in an RRC Establishment procedure or an RRC Re-Establishment procedure, in addition to an RRC reconfiguration procedure.

A program running on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. The "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. The above-described program may be configured to realize some of the functions described above, and additionally may be configured to realize the functions described above, in combination with a program already recorded in the computer system.

Each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be configured of a digital circuit, or may be configured of an analog circuit. In a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. A configuration in which constituent elements, described in the embodiments and having mutually the same effects, are substituted for one another is also included in the technical scope of the present invention.

Summary

A terminal apparatus according to Aspect 1 of the present invention is a terminal apparatus for communicating with one or multiple base station apparatuses, the terminal apparatus including: a receiver configured to receive an RRC reconfiguration message from a base station apparatus of the one or multiple base station apparatuses; and a processing unit configured to establish an SDAP entity, and notify higher layers of a list of QoS flow identifiers corresponding to an established DRB having a DRB identity and DRB establishment information, in a case that DRB configuration including the DRB identity that is not part of configuration of the terminal apparatus, in a DRB configuration list included in the RRC reconfiguration message received by the receiver, includes SDAP entity configuration, and that a PDU session identifier associated with the SDAP configuration is not in part of configuration of the terminal apparatus.

A terminal apparatus according to Aspect 2 of the present invention is a terminal apparatus for communicating with one or multiple base station apparatuses, the terminal apparatus including: a receiver configured to receive an RRC reconfiguration message from a base station apparatus of the one or multiple base station apparatuses; and a processing unit configured to reconfigure an SDAP entity, and notify higher layers of a list of QoS flow identifiers corresponding to an established DRB having a DRB identity and DRB establishment information, in a case that DRB configuration including the DRB identity that is not part of configuration of the terminal apparatus, in a DRB configuration list included in the RRC reconfiguration message received by the receiver, includes SDAP entity configuration, and that a PDU session identifier associated with the SDAP configuration is in part of configuration of the terminal apparatus.

A terminal apparatus according to Aspect 3 of the present invention is a terminal apparatus for communicating with one or multiple base station apparatuses, the terminal apparatus including: a receiver configured to receive an RRC reconfiguration message from a base station apparatus of the one or multiple base station apparatuses; and a processing unit configured to reconfigure an SDAP entity, and notify higher layers of a list of released QoS flow identifiers and release information, in a case that the RRC reconfiguration message received by the receiver includes a list of QoS flow identifiers to be released.

A terminal apparatus according to Aspect 4 of the present invention is a terminal apparatus for communicating with one or multiple base station apparatuses, the terminal apparatus including: a receiver configured to receive an RRC reconfiguration message from a base station apparatus of the base station apparatuses; and a processing unit configured to notify higher layers of a list of QoS flow identifiers corresponding to DRB identities to be released and release information, in a case that the RRC reconfiguration message received by the receiver includes a list of the DRB identities to be released, and the DRB identities to be released are associated with an SDAP entity.

A method according to Aspect 5 of the present invention is a method performed by a terminal apparatus for communicating with one or multiple base station apparatuses, the method including the steps of: receiving an RRC reconfiguration message from a base station apparatus of the one or multiple base station apparatuses; and establishing an SDAP entity, and notifying higher layers of a list of QoS flow identifiers corresponding to an established DRB having a DRB identity and DRB establishment information, in a case that DRB configuration including the DRB identity that is not part of configuration of the terminal apparatus, in a DRB configuration list included in the RRC reconfiguration message received by the receiver, includes SDAP entity configuration, and that a PDU session identifier associated with the SDAP configuration is not in part of configuration of the terminal apparatus.

A terminal apparatus according to Aspect 6 of the present invention is a terminal apparatus for communicating with a base station apparatus, the terminal apparatus including: a receiver configured to receive, from the base station apparatus, a Radio Resource Control (RRC) reconfiguration message including a Data Radio Bearer (DRB) identity to be released; a storage unit configured to store a Quality of Service (QoS) flow to DRB mapping rule, the DRB identity being associated with a Service Data Adaptation Protocol (SDAP) entity; and a processing unit configured to release all of a plurality of the QoS flow to DRB mapping rules corresponding to a DRB indicated by the DRB identity, based on the RRC reconfiguration message.

A base station apparatus according to Aspect 7 of the present invention is a base station apparatus for communicating with a terminal apparatus, the base station apparatus including: a generation unit configured to generate a Radio Resource Control (RRC) reconfiguration message including a Data Radio Bearer (DRB) identity to be released; and a transmitter configured to transmit the RRC reconfiguration message to the terminal apparatus, wherein the DRB identity is associated with a Service Data Adaptation Protocol (SDAP) entity, the terminal apparatus includes a storage unit configured to store a Quality of Service (QoS) flow to DRB mapping rule, and the RRC reconfiguration message is a message for causing the terminal apparatus to release all of a plurality of the QoS flow to DRB mapping rules corresponding to a DRB indicated by the DRB identity.

A method according to Aspect 8 of the present invention is a method performed by a terminal apparatus for communicating with a base station apparatus, the method including the steps of: storing a Quality of Service (QoS) flow to Data Radio Bearer (DRB) mapping rule in a storage unit; receiving, from the base station apparatus, a Radio Resource Control (RRC) reconfiguration message including a DRB identity to be released; and releasing all of a plurality of the QoS flow to DRB mapping rules corresponding to a DRB indicated by the DRB identity, based on the RRC reconfiguration message, wherein the DRB identity is associated with a Service Data Adaptation Protocol (SDAP) entity.

A method according to Aspect 9 of the present invention is a method performed by a terminal apparatus for communicating with a base station apparatus, the method including the steps of: generating a Radio Resource Control (RRC) reconfiguration message including a Data Radio Bearer (DRB) identifier to be released; and transmitting the RRC reconfiguration message to the terminal apparatus, wherein the terminal apparatus includes a storage unit configured to store a Quality of Service (QoS) flow to DRB mapping rule, and the RRC reconfiguration message is a message for causing the terminal apparatus to release all of a plurality of the QoS flow to DRB mapping rules corresponding to a DRB indicated by the DRB identity.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

CROSS-REFERENCE TO RELATED APPLICATIONS

This application claims the benefit of priority to JP 2017-219902 filed on Nov. 15, 2017, contents of which are incorporated herein by reference in its entirety.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
500, 1300 Receiver
502 Storage unit
504, 1302 Processing unit

The invention claimed is:

1. A terminal apparatus for communicating with a base station apparatus, the terminal apparatus comprising:
a receiver configured to receive, from the base station apparatus, a first Radio Resource Control (RRC) reconfiguration message including a Data Radio Bearer (DRB) configuration, the DRB configuration including a DRB identity to be added;
processing circuitry configured to determine a Service Data Adaptation Protocol (SDAP) entity to be established or to be reconfigured when a DRB identified by the DRB identity is added and the DRB identity of the DRB is associated to the SDAP entity; and
storage circuitry configured to store a Quality of Service (QoS) flow to DRB mapping rule for the SDAP entity which is established or reconfigured when the DRB is added, wherein
the receiver is configured to receive, from the base station apparatus, a second RRC reconfiguration message including a DRB identity to be released, and
the processing circuitry is configured to release all of a plurality of the QoS flow to DRB mapping rules for the SDAP entity that correspond to a DRB indicated by the DRB identity to be released, based on the second RRC reconfiguration message.

2. A base station apparatus for communicating with a terminal apparatus, the base station apparatus comprising:
generation circuitry configured to generate a first Radio Resource Control (RRC) reconfiguration message including a Data Radio Bearer (DRB) configuration, the DRB configuration including a DRB identity to be added; and
a transmitter configured to transmit the first RRC reconfiguration message to the terminal apparatus, wherein
the DRB configuration is a configuration for causing the terminal apparatus to determine a Service Data Adaptation Protocol (SDAP) entity to be established or to be reconfigured when a DRB identified by the DRB identity is added and the DRB identity of the DRB is associated to the SDAP entity, the terminal apparatus includes storage circuitry configured to store a Quality of Service (QoS) flow to DRB mapping rule for the SDAP entity which is established or reconfigured when the DRB is added, the generation circuitry is configured to generate a second RRC reconfiguration message including a DRB identity to be released, the transmitter is configured to transmit the second RRC reconfiguration message to the terminal apparatus, and the second RRC reconfiguration message is a message for causing the terminal apparatus to release all of a plurality of the QoS flow to DRB mapping rules for the SDAP entity that correspond to a DRB indicated by the DRB identity to be released.

3. A method performed by a terminal apparatus for communicating with a base station apparatus, the method comprising the steps of:

receiving, from the base station apparatus, a first Radio Resource Control (RRC) reconfiguration message including a DRB configuration, the DRB configuration including a DRB identity to be added;

determining a Service Data Adaptation Protocol (SDAP) entity to be established or to be reconfigured when a DRB identified by the DRB identity is added and the DRB identity of the DRB is associated to the SDAP entity;

storing, in storage circuitry, a Quality of Service (QoS) flow to Data Radio Bearer (DRB) mapping rule for the SDAP entity which is established or reconfigured when the DRB is added;

receiving, from the base station apparatus, a second RRC reconfiguration message including a DRB identity to be released; and releasing all of a plurality of the QoS flow to DRB mapping rules for the SDAP entity that correspond to a DRB indicated by the DRB identity to be released, based on the second RRC reconfiguration message.

4. A method performed by a base station apparatus for communicating with a terminal apparatus, the method comprising the steps of:

generating a first Radio Resource Control (RRC) reconfiguration message including a Data Radio Bearer (DRB) configuration, the DRB configuration including a DRB identity to be added;

transmitting the first RRC reconfiguration message to the terminal apparatus, wherein the DRB configuration is a configuration for causing the terminal apparatus to determine a Service Data Adaptation Protocol (SDAP) entity to be established or to be reconfigured when a DRB identified by the DRB identity is added and the DRB identity of the DRB is associated to the SDAP entity, and wherein the terminal apparatus includes storage circuitry configured to store a Quality of Service (QoS) flow to DRB mapping rule for the SDAP entity which is established or reconfigured when the DRB is added;

generating a second RRC reconfiguration message including a DRB identity to be released; and transmitting the second RRC reconfiguration message to the terminal apparatus, wherein the second RRC reconfiguration message is a message for causing the terminal apparatus to release all of a plurality of the QoS flow to DRB mapping rules for the SDAP entity that correspond to a DRB indicated by the DRB identity to be released.

* * * * *